United States Patent
Katamoto et al.

(10) Patent No.: US 6,860,657 B2
(45) Date of Patent: Mar. 1, 2005

(54) PRINTING METHOD, PRINTING SYSTEM AND IMAGE FORMING APPARATUS

(75) Inventors: Koji Katamoto, Yamatokooriyama (JP); Yasuhiro Nakai, Souraku-gun (JP); Masao Saeda, Yamatokooriyama (JP); Tamotsu Fukushima, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/745,734

(22) Filed: Dec. 23, 2003

(65) Prior Publication Data

US 2004/0134370 A1 Jul. 15, 2004

(30) Foreign Application Priority Data

Dec. 27, 2002 (JP) ........................................ 2002-379630

(51) Int. Cl.⁷ .............................................. B41J 11/44
(52) U.S. Cl. .............................. 400/76; 400/70; 400/61
(58) Field of Search ............................... 400/76, 70, 61

(56) References Cited

U.S. PATENT DOCUMENTS

2002/0026321 A1 * 2/2002 Faris et al. .................... 705/1
2004/0015408 A1 * 1/2004 Rauen et al. ................. 705/26
2004/0032400 A1 * 2/2004 Freeman et al. ............. 345/173

FOREIGN PATENT DOCUMENTS

JP  2002-268853  9/2002

OTHER PUBLICATIONS

Computer translation of JP 2002–268853.*

* cited by examiner

*Primary Examiner*—Charles H. Nolan, Jr.
(74) *Attorney, Agent, or Firm*—David G. Conlin; David A. Tucker; Edwards & Angell, LLP

(57) ABSTRACT

When a print process command is outputted from a port terminal, an MFP displays first print information related to the print process command of the port terminal on a display unit. On the other hand, when a print process command is outputted from a personal computer, the MFP receives authentication information, and displays second print information related to the print process command of the personal computer on the display unit only when the received authentication information matches pre-stored authentication information. Then, the MFP prints print data outputted from the personal computer on condition that the second print information is displayed on the display unit. For example, the staff in a shop can print the print data for business use by using an MFP for use by customers in the shop while ensuring security, and it is possible to prevent confusion between a plurality of customers and the shop staff in operating the MFP.

24 Claims, 27 Drawing Sheets

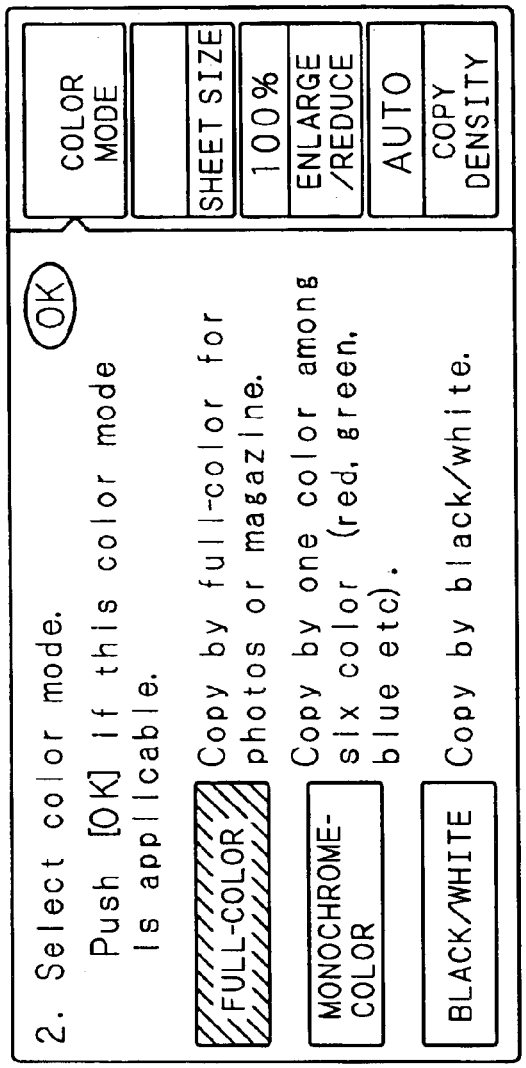
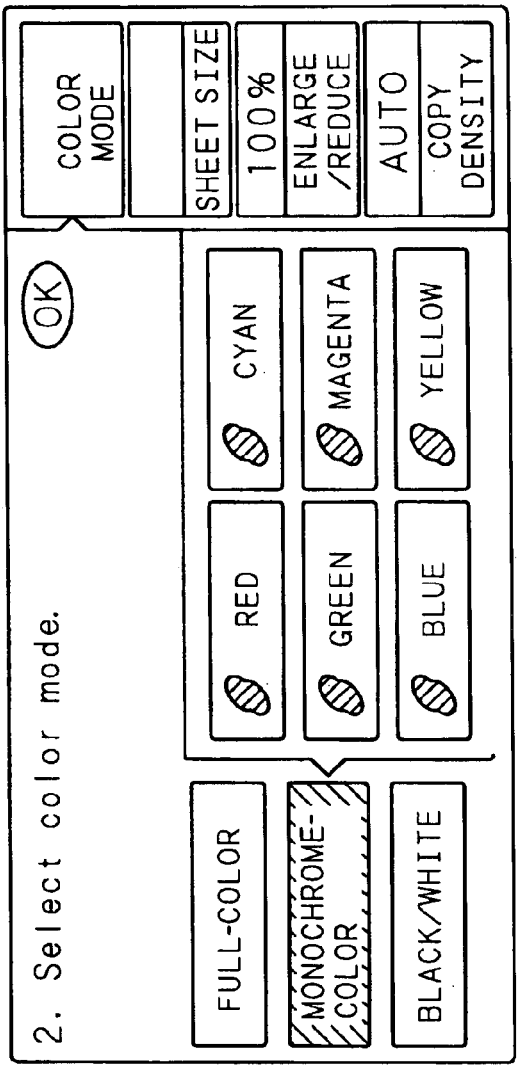
FIG. 7A
FIG. 7B

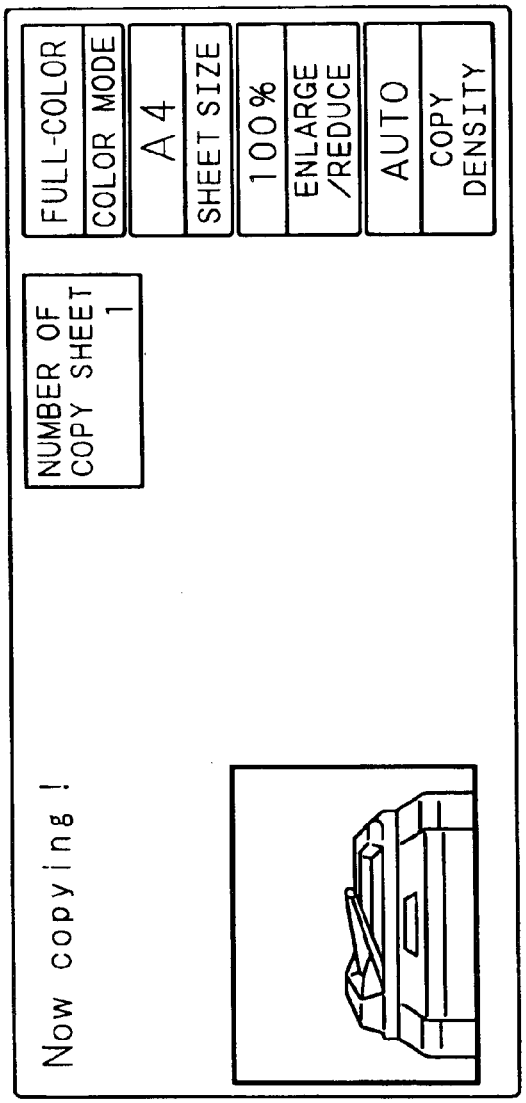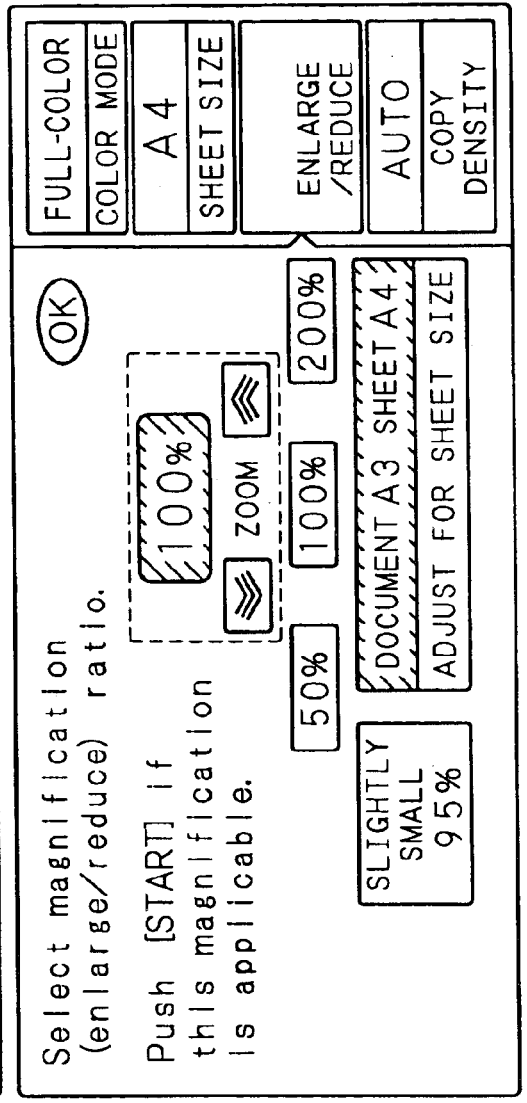
FIG. 10A
FIG. 10B

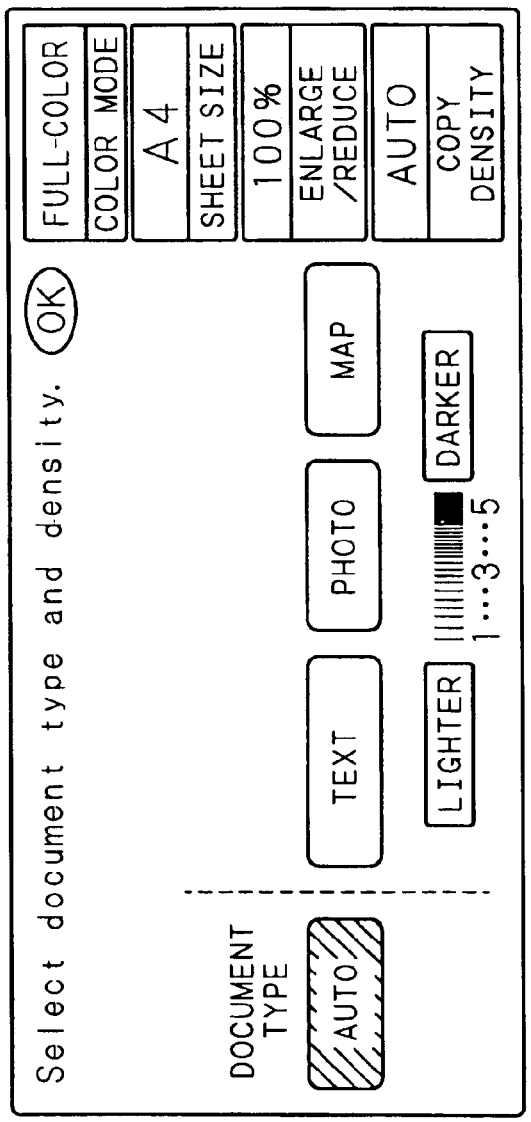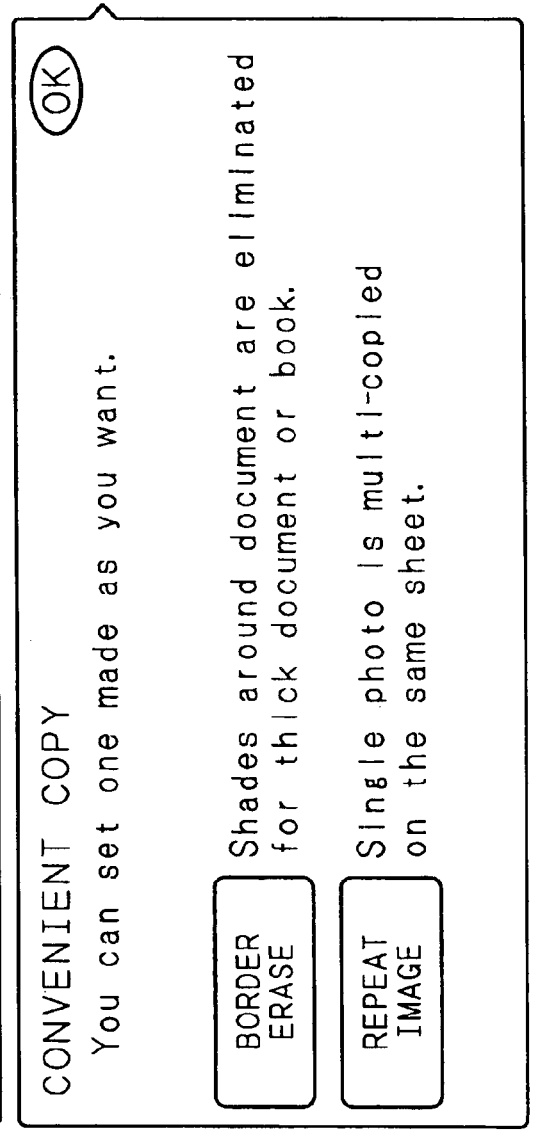
FIG. 11A
FIG. 11B

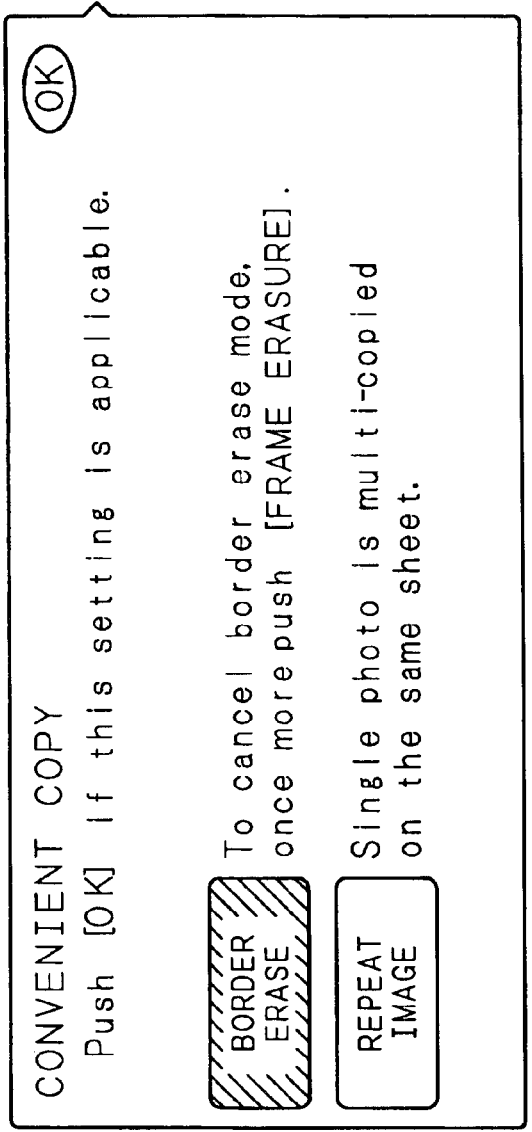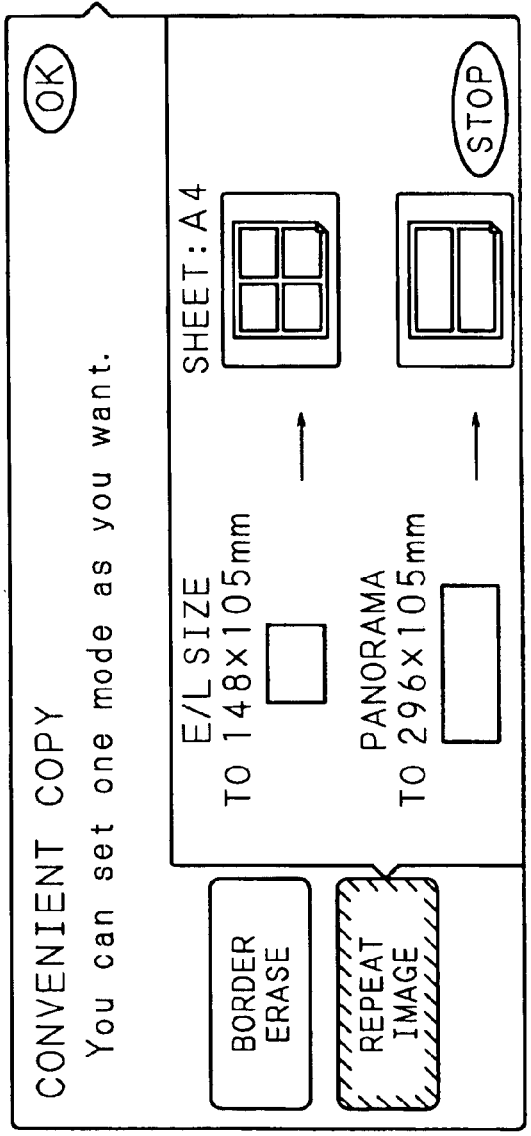
FIG. 12A
FIG. 12B

FIG. 15

1st PRINT DATA FILE 551

| RECEIVED DATE | PRINT DATA (FILE NAME) | IDENTIFICATION INFORMATION | HISTORY |
|---|---|---|---|
| 2002/05/20 11:15 | O×O.bmp | 1115 | COMPLETED |
| 2002/05/20 12:10 | O×△.html<br>O×x.html | 1210 | NOT COMPLETED |
| 2002/05/20 12:12 | 0001.jpeg<br>0002.jpeg<br>0003.jpeg | 1212 | NOT COMPLETED |
| ... | ... | ... | ... |

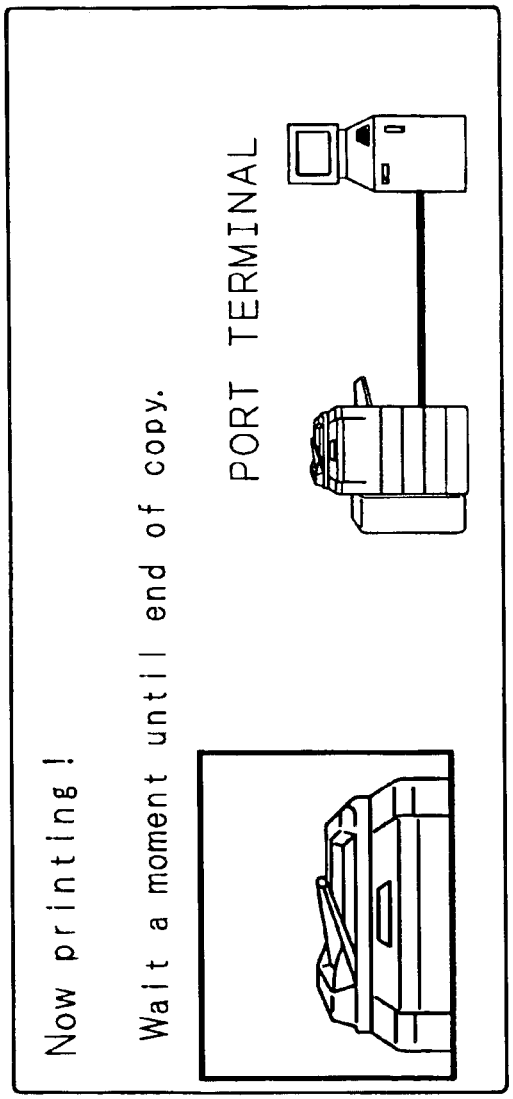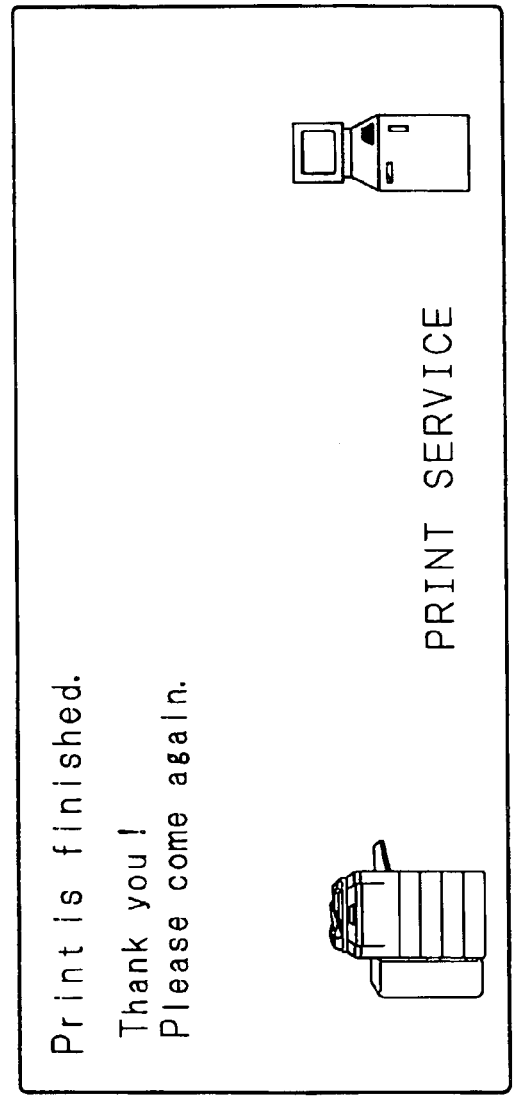

FIG. 21A

| KEY OPERATOR PROGRAM | | OK |
|---|---|---|
| PRINT FOR BUSINESS USE | | HALT/DELETE |
| FILE NAME | MONTH/DAY TIME | |
| 1. BUYING IN LIST.XLS | 01/28(Sat.) 04:22 | |
| 2. STOCK LIST.XLS | 01/28(Sat.) 04:28 | |
| 3. LEAFLET OF NEW PRODUCTIONS.PDF | 01/28(Sat.) 04:31 | |
| ← → 1/1 | | EXECUTING PRINT |

FIG. 21B

| KEY OPERATOR PROGRAM | | OK |
|---|---|---|
| PRINT FOR BUSINESS USE | | HALT/DELETE |
| FILE NAME | MONTH/DAY TIME | |
| 1. BUYING IN | | |
| 2. STOCK LIS | Now printing! Wait a moment until print is over. [HALT PRINT] | |
| 3. LEAFLET O PRODUCTIO | | |
| ← → 1/1 | | EXECUTING PRINT |

FIG. 22

| KEY OPERATOR PROGRAM | | | OK |
|---|---|---|---|
| PRINT FOR BUSINESS USE | | | |
| FILE NAME | MONTH/DAY | TIME | HALT/DELETE |
| 1. STOCK LIST.XLS | 01/28(Sat.) | 04:28 | |
| 2. LEAFLET OF NEW PRODUCTIONS.PDF | 01/28(Sat.) | 04:31 | EXECUTING PRINT |

2nd PRINT DATA FILE          552

| RECEIVED DATE | PRINT DATA (FILE NAME) | HISTORY |
|---|---|---|
| 2002/01/27 10:55 | INSTRUCTION FOR EACH SHOP.html | COMPLETED |
| 2002/01/28 4:22 | BUYING IN LIST. XLS | NOT COMPLETED |
| 2002/01/28 4:28 | STOCK LIST. XLS | NOT COMPLETED |
| 2002/01/28 4:31 | LEAFLET OF NEW PRODUCTIONS. PDF | NOT COMPLETED |
| ⋮ | ⋮ | ⋮ |

# PRINTING METHOD, PRINTING SYSTEM AND IMAGE FORMING APPARATUS

BACKGROUND OF THE INVENTION

1. Field of the Invention

The present invention is applied to a printing system in which an image forming apparatus and two information processing apparatuses are connected through a network. More specifically, the present invention relates to a printing method, a printing system and an image forming apparatus for printing the print data outputted from two information processing apparatuses by using the image forming apparatus, and more particularly relates to a printing method and so on capable of restricting display of information related to a print process command of an information processing apparatus for shop staff when an information processing apparatus for customers and the information processing apparatus for shop staff are installed in a shop and the both information processing apparatuses commonly uses one image forming apparatuses.

2. Description of Related Art

In recent years, it is generally seen that image forming apparatuses such as copying machines are installed in shops such as convenience stores in town to provide copy services. A plurality of users can easily use such copy services by bringing book documents, sheet documents, etc. Moreover, with the recent development of digital image forming apparatuses, multi function type image forming apparatuses (Multi Function Printer: MFP) are commercialized. The MFP has printer function for electronically scanning a document image with a scanner device and printing out the image with a laser printer or other printer, copying function, and facsimile function. Such digital image forming apparatuses have the advantages of enabling high image quality output, free image processing, one-scan multi-copy, storage of electronic data of documents, etc., and the advantages of digital image forming apparatuses are provided as new document services in markets.

In such a situation, an increasing number of recent image forming apparatuses for copy services are developed as digital and color image forming apparatuses, and it is popular to install color digital copying machines. Furthermore, there are provided document output services such as making "black-and-white" copies and color copies from a monochrome document, or a color document, and printing out in color the information obtained through a network.

As a printing service using a network environment, for example, a network print system disclosed in Japanese Patent Application Laid-Open No. 2002-268853 is known. The Japanese Patent Application Laid-Open No. 2002-268853 discloses a network print system in which print data is registered in advance in a server from a personal computer of a user and printed out, via the Internet, by a printout device installed in a place the user visits.

On the other hand, there may be a case where the shop staff in a shop such as a convenience store prints the pay slips of stuff in the shop, new product information, sales data, instruction documents from the headquarters, etc. In such a case, conventionally, the print data is generally printed by an ink jet printer, laser printer, or other printer connected to a personal computer installed in the staff room in the shop.

Therefore, even though a multi-function, high-performance image forming apparatus for customers is present in the shop, it is necessary to separately prepare a printer for shop staff, and this is irrational. In order to eliminate the irrationality, it may be considered to connect the personal computer for shop staff to the image forming apparatus for customers. However, it is often the case that the print data as described above is highly confidential data including business data of the shop, and there is a fear that a customer may carry away the print data by mistake.

In addition, as described above, since the multi-function image forming apparatus may be used as a copying machine or a printer by a plurality of customers, if the image forming apparatus is further used as a printer for business use by the shop staff, the customers and the shop staff may be confused in operating the image forming apparatus.

BRIEF SUMMARY OF THE INVENTION

The present invention has been made with the aim of solving the above problems, and it is a principal object of the present invention to provide a printing method, a printing system and an image forming apparatus capable of not displaying information related to a print process command from an information processing apparatus for shop staff if the authentication information does not match, and thereby enabling the shop staff to print the print data for business use by using an image forming apparatus for use by customers in the shop while ensuring security, and avoiding confusion between a plurality of customers and the shop staff in operating the image forming apparatus.

Another object of the present invention is to provide a printing system and an image forming apparatus capable of enabling a customer to distinguish and obtain his/her own printed matter even when there are a plurality of customers who wish to perform printing, and capable of tempting other customers who are waiting to use the image forming apparatus to shop in the convenience store and thereby increasing sales.

According to a first aspect of the printing method of the present invention, there is provided a printing method for causing an image forming apparatus, including displaying means, arithmetic means and inputting means, to print print data outputted from a first information processing apparatus or a second information processing apparatus respectively connected to the image forming apparatus through a network, the method being characterized by comprising the steps of: when a print process command is outputted from the first information processing apparatus to the image forming apparatus, by the arithmetic means, displaying first print information related to the print process command of the first information processing apparatus on the displaying means; by the inputting means, receiving authentication information; comparing the authentication information received by the inputting means with pre-stored authentication information; and when a print process command is outputted from the second information processing apparatus to the image forming apparatus and the compared result of both authentication information match, by the arithmetic means, displaying second print information related to the print process command of the second information processing apparatus on the displaying means, instead of the first print information.

Moreover, in the first aspect of the printing method of the present invention, the printing method is characterized by further comprising the steps of: printing the print data outputted from the first information processing apparatus, after the first print information is displayed on the displaying means; and printing the print data outputted from the second information processing apparatus, after the second print information is displayed on the displaying means.

Furthermore, in the first aspect of the printing method of the present invention, the printing method is characterized by further comprising the steps of: by the first information processing apparatus, outputting print data and identification information for identifying the print data to the image forming apparatus; by the first information processing apparatus, outputting the identification information to outside; by the image forming apparatus, receiving an input of identification information from outside when the displaying means displays the first print information; by the image forming apparatus, extracting print data identified by identification information that matches the received identification information; and by the image forming apparatus, printing the extracted print data.

According to a second aspect of the printing method of the present invention, there is provided a printing method for causing an image forming apparatus, including displaying means, arithmetic means, inputting means and reading means for reading a document and generating print data, to print print data outputted from a first information processing apparatus or a second information processing apparatus respectively connected to the image forming apparatus through a network, or print data generated by the reading means, the method being characterized by comprising the steps of: when a print process command is outputted from the first information processing apparatus to the image forming apparatus, by the arithmetic means, displaying first print information related to the print process command of the first information processing apparatus on the displaying means; displaying document print process information related to a print process command of print data generated by the reading means on the displaying means; receiving authentication information by the inputting means; comparing the authentication information received by the inputting means with pre-stored authentication information; and when a print process command is outputted from the second information processing apparatus to the image forming apparatus and the compared result of both authentication information match, by the arithmetic means, displaying second print information related to the print process command of the second information processing apparatus on the displaying means, instead of the first print information or the document print process information.

Moreover, in the second aspect of the printing method of the present invention, the printing method is characterized by further comprising the steps of: printing the print data outputted from the first information processing apparatus, after the first print information is displayed on the displaying means; printing the print data outputted from the second information processing apparatus, after the second print information is displayed on the displaying means; and printing the print data generated by the reading means, after the document print process information is displayed on the displaying means.

Furthermore, in the second aspect of the printing method of the present invention, the printing method is characterized by further comprising the steps of: by the first information processing apparatus, outputting print data and identification information for identifying the print data to the image forming apparatus; by the first information processing apparatus, outputting the identification information to outside; by the image forming apparatus, receiving an input of identification information from outside when the displaying means displays the first print information; by the image forming apparatus, extracting print data identified by identification information that matches the received identification information; and printing the extracted print data.

According to a first aspect of the printing system of the present invention, there is provided a printing system for causing an image forming apparatus to print print data outputted from a first information processing apparatus or a second information processing apparatus respectively connected to the image forming apparatus through a network, the system being characterized in that the image forming apparatus comprises: displaying means; first display controlling means for displaying, when a print process command is outputted from the first information processing apparatus, first print information related to the print process command of the first information processing apparatus on the displaying means; authentication information receiving means for receiving authentication information; means for comparing the authentication information received by the authentication information receiving means with pre-stored authentication information; and second display controlling means for displaying, when a print process command is outputted from the second information processing apparatus and the compared result of both authentication information match, second print information related to the print process command of the second information processing apparatus on the displaying means, instead of the first information.

Moreover, in the first aspect of the printing system of the present invention, the printing system is characterized in that the image forming apparatus further comprises: first printing means for printing the print data outputted from the first information processing apparatus, after the first print information is displayed on the displaying means by the first display controlling means; and second printing means for printing the print data outputted from the second information processing apparatus, after the second print information is displayed on the displaying means by the second display controlling means.

Furthermore, in the first aspect of the printing system of the present invention, the printing system is characterized in that the first information processing apparatus comprises: outputting means for outputting to the image forming apparatus print data and identification information for identifying the print data; and identification information outputting means for outputting the identification information to outside, and the image forming apparatus comprises: identification information receiving means for receiving an input of identification information from outside when the first print information is displayed by the first display controlling means; and extracting means for extracting print data identified by identification information that matches the identification information received by the identification information receiving means, whereby the first printing means prints the print data extracted by the extracting means.

According to a second aspect of the printing system of the present invention, there is provided a printing system for causing an image forming apparatus, including displaying means, inputting means and reading means for reading a document and generating print data, to print print data outputted from a first information processing apparatus or a second information processing apparatus respectively connected to the image forming apparatus through a network, or print data generated by the reading means, the system being characterized in that the image forming apparatus comprises: first display controlling means for displaying, when a print process command is outputted from the first information processing apparatus, first print information related to the print process command of the first information processing apparatus on the displaying means; document print process information display controlling means for displaying document print process information related to a print process command of print data generated by the reading means on the displaying means; authentication information receiving means for receiving authentication information; means for comparing the authentication information received by the authentication information receiving means with pre-stored authentication information; and second display controlling means for displaying, when a print process command is outputted from the second information processing apparatus and the compared result of both authentication information match, second print information related to the print process command of the second information processing apparatus on the displaying means.

Moreover, in the second aspect of the printing system of the present invention, the printing system is characterized in that the image forming apparatus further comprises: first printing means for printing the print data outputted from the first information processing apparatus, after the first print information is displayed on the displaying means by the first display controlling means; second printing means for printing the print data outputted from the second information processing apparatus, after the second print information is displayed on the displaying means by the second display controlling means; and third printing means for printing the print data generated by the reading means, after the document print process information is displayed on the displaying means by the document print process information display controlling means.

Furthermore, in the second aspect of the printing system of the present invention, the printing system is characterized in that the first information processing apparatus comprises: outputting means for outputting print data and identification information for identifying the print data to the image forming apparatus; and identification information outputting means for outputting the identification information to outside, and the image forming apparatus comprises: identification information receiving means for receiving an input of identification information from outside when the first print information is displayed by the first display controlling means; and extracting means for extracting print data identified by identification information that matches the identification information received by the identification information receiving means, whereby the first printing means prints the print data extracted by the extracting means.

According to a first aspect of the image forming apparatus of the present invention, there is provided an image forming apparatus, including displaying means, for printing the print data outputted from a first information processing apparatus or a second information processing apparatus respectively connected thereto through a network, the apparatus being characterized by comprising: first display controlling means for displaying, when a print process command is outputted from the first information processing apparatus, first print information related to the print process command of the first information processing apparatus on the displaying means; authentication information receiving means for receiving authentication information; means for comparing the authentication information received by the authentication information receiving means with pre-stored authentication information; and second display controlling means for displaying, when a print process command is outputted from the second information processing apparatus and the compared result of both authentication information match, second print information related to the print process command of the second information processing apparatus on the displaying means.

Moreover, in the first aspect of the image forming apparatus of the present invention, the image forming apparatus is characterized by further comprising: first printing means for printing the print data outputted from the first information processing apparatus, after the first print information is displayed on the displaying means by the first display controlling means; and second printing means for printing the print data outputted from the second information processing apparatus, after the second print information is displayed on the displaying means by the second display controlling means.

Furthermore, in the first aspect of the image forming apparatus of the present invention, the image forming apparatus is characterized by further comprising: identification information receiving means for receiving identification information inputted from outside for identifying print data outputted from the first information processing apparatus to outside; and extracting means for extracting print data outputted from the first information processing apparatus which is identified by identification information that matches the identification information received by the identification information receiving means, whereby the first printing means prints the print data extracted by the extracting means.

According to a second aspect of the image forming apparatus of the present invention, there is provided an image forming apparatus, including displaying means, inputting means and reading means for reading a document and generating print data, for printing print data outputted from a first information processing apparatus or a second information processing apparatus respectively connected thereto through a network, or print data generated by the reading means, the apparatus being characterized by comprising: first display controlling means for displaying, when a print process command is outputted from the first information processing apparatus, first print information related to the print process command of the first information processing apparatus on the displaying means; document print process information display controlling means for displaying document print process information related to a print process command of image data of a document to be read by the reading means on the displaying means; authentication information receiving means for receiving authentication information; means for comparing the authentication information received by the authentication information receiving means with pre-stored authentication information; and second display controlling means for displaying, when a print process command is outputted from the second information processing apparatus and the compared result of both authentication information match, second print information related to the print process command of the second information processing apparatus on the displaying means.

Moreover, in the second aspect of the image forming apparatus of the present invention, the image forming apparatus is characterized by further comprising: first printing means for printing the print data outputted from the first information processing apparatus, after the first print information is displayed on the displaying means by the first display controlling means; second printing means for printing the print data outputted from the second information processing apparatus, after the second print information is displayed on the displaying means by the second display controlling means; and third printing means for printing the print data generated by the reading means, after the document print process information is displayed on the displaying means by the document print process information display controlling means.

Furthermore, in the second aspect of the image forming apparatus of the present invention, the image forming apparatus is characterized by further comprising: identification information receiving means for receiving identification information inputted from outside for identifying print data outputted from the first information processing apparatus to outside; and extracting means for extracting print data outputted from the first information processing apparatus which is identified by identification information that matches the identification information received by the identification information receiving means, whereby the first printing means prints the print data extracted by the extracting means.

According to the present invention, when a print process command is outputted from the first information processing apparatus, first print information related to the print process command of the first information processing apparatus is displayed on the displaying means. Further, when the first print information is displayed on the displaying means, the image forming apparatus prints the print data outputted from the first information processing apparatus. On the other hand, when a print process command is outputted from the second information processing apparatus, the image forming apparatus receives authentication information, and second print information related to the print process command of the second information processing apparatus is displayed on the displaying means only when the received authentication information matches pre-stored authentication information. The first print information is, for example, information about print data that a customer acquired using the first information processing apparatus via the Internet or the like. The second print information is, for example, a display of a list of the names of print jobs corresponding to print data for business use outputted from the second information processing apparatus.

Besides, since the image forming apparatus prints the print data outputted from the second information processing apparatus on condition that the second print information is displayed on the displaying means, the print data for business use can not be seen by customers and security can be ensured. In addition, since the second print information is not displayed on the displaying means if the authentication information does not match, the customer can refer to the information about copying of a document or printing of print data acquired by the first information processing apparatus and use the image forming apparatus without confusion.

Furthermore, in the present invention, the first information processing apparatus outputs print data and identification information for specifying individual print data to the image forming apparatus and separately outputs identification information, such as a barcode and four digits, to outside by, for example, printing out the identification information or displaying the identification information on a screen. The image forming apparatus receives an input of the identification information outputted to outside, and extracts and prints print data corresponding to the matching received identification information and identification information outputted from the first information processing apparatus. Accordingly, a customer can print the print data acquired by the first information processing apparatus at a suitable time by using the image forming apparatus, and it is possible to prevent the print data of the customer from being mixed with the print data of other customers.

The above and further objects and features of the invention will more fully be apparent from the following detailed description with accompanying drawings.

BRIEF DESCRIPTION OF THE SEVERAL VIEWS OF THE DRAWINGS

FIG. 7A and FIG. 7B are schematic views showing the display state of the display unit of the multi function printer, for guiding the procedure of copy process;

FIG. 10A and FIG. 10B are schematic views showing the display state of the display unit of the multi function printer, for guiding the procedure of copy process;

FIG. 11A and FIG. 11B are schematic views showing the display state of the display unit of the multi function printer, for guiding the procedure of copy process;

FIG. 12A and FIG. 12B are schematic views showing the display state of the display unit of the multi function printer, for guiding the procedure of copy process;

FIG. 15 is an explanatory view showing the record layout of a first print data file;

FIG. 18A and FIG. 18B are schematic views showing the display state of the display unit of the multi function printer, for guiding the procedure of first print process;

FIG. 21A and FIG. 21B are schematic views showing the display state of the display unit of the multi function printer, for guiding the procedure of second print process;

FIG. 22 is a schematic view showing the display state of the display unit of the multi function printer, for guiding the procedure of second print process;

FIG. 23 is an explanatory view showing the record layout of a second print data file;

DETAILED DESCRIPTION OF THE PREFERRED EMBODIMENTS

The following description will explain the present invention in detail based on the drawings illustrating preferred embodiments thereof.

Figure 1:
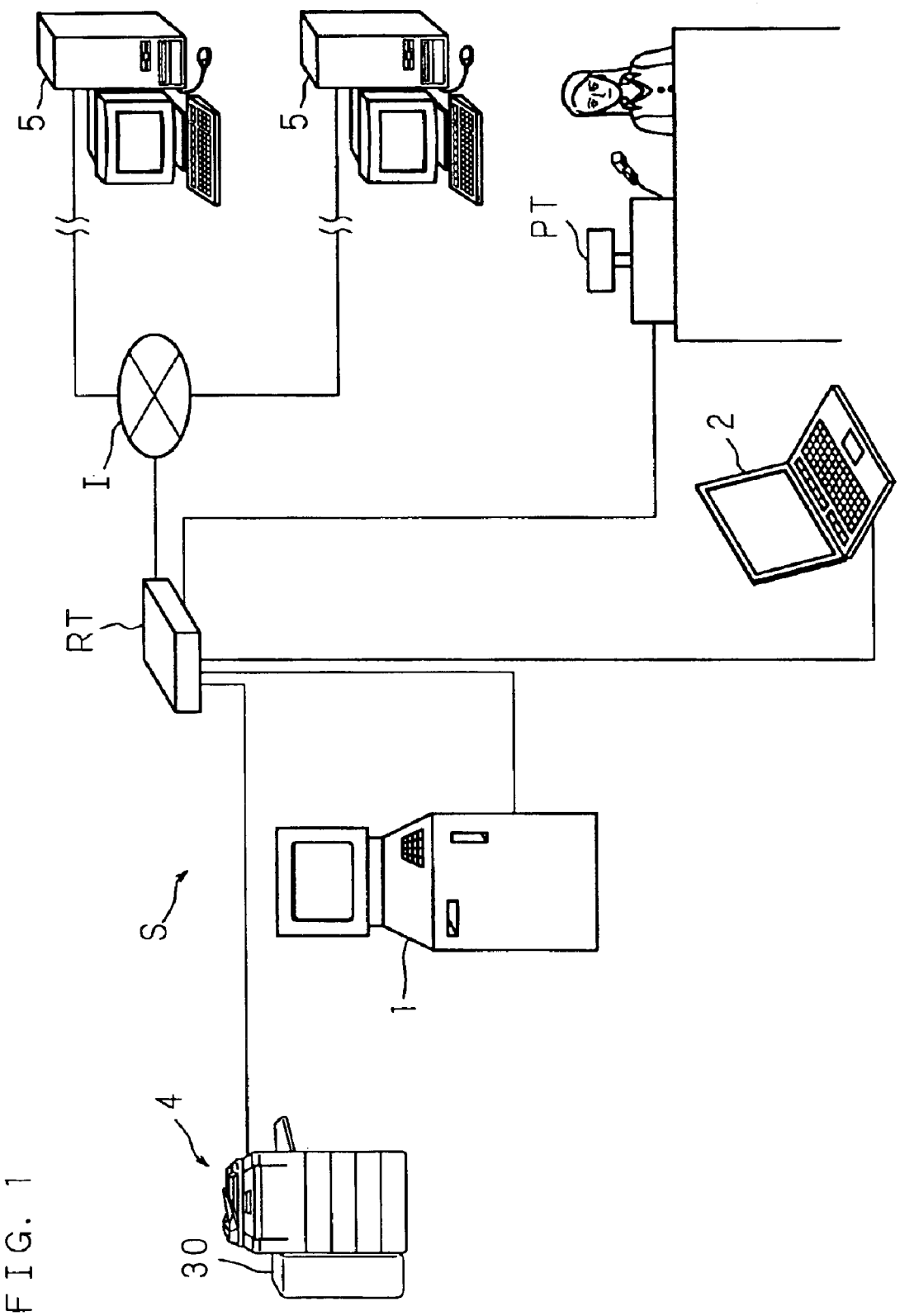
FIG. 1 is a schematic view showing an outline of the entire network construction of a printing system of the present invention.

FIG. 1 is a schematic view showing an outline of the entire network construction of a printing system of the present invention. In FIG. 1, reference numeral 1 denotes a port terminal as a first information processing apparatus that is installed in a shop such as a convenience store and connected to a network (hereinafter referred to as the Internet) I through a LAN (Local Area Network) S and a router RT in the shop. This port terminal 1 can transmit and receive HTML files, computer programs, image data, etc. to/from a Web server 5 using HTTP (Hyper Text Transfer Protocol).

The port terminal 1 performs various functions, such as purchasing concert tickets and downloading images from a network album stored in the Web server 5, by communicating with the Web server 5. By inserting predetermined coins, image data downloaded by the port terminal 1 via the Internet I, or image data read by a reader for a recording medium such as a memory card, provided in the port terminal 1 itself, is transmitted as print data to a multi function printer (hereinafter referred to as the MFP) 4, which is installed in the same shop and serves as an image forming apparatus connected to the port terminal 1 through the LAN S and router RT, and printed out. The MFP 4 has multi functions such as copying function and printer function. As one of the functions, the MFP 4 performs the function as the printer according to a request from the port terminal 1.

On the other hand, on condition that a predetermined amount of money is inserted into a coin vender 30 serving as a valuable information acquiring device for acquiring the valuable information of the insertion of coins or the valuable information stored in a prepaid card, the MFP 4 performs the function as the copying machine for copying a document placed on a document platen. Note that although this embodiment explains the case where these apparatuses and network are built in a shop such as a convenience store, the present invention is not limited to this and may be applied, for example, to networks built in Universities, offices, etc. Needless to say, the MFP 4 may have facsimile transmission and reception functions, for example, in addition to the copying function and printer function.

Furthermore, connected to the LAN S are a POS terminal PT installed in a register in the shop, and a personal computer 2 serving as the second information processing apparatus. The POS terminal PT manages sales data, etc., and transmits the management data managed by batch processing to a server computer (not shown) in the headquarters of the convenience store through the Internet I. The personal computer 2 is a typical general purpose computer which is not used by customers, but is used by the shop staff in the staff room, etc. to create the sales data, shift schedules of temporary employees, posters, brochures, etc. The present invention adopts a construction capable of outputting the print data from the personal computer 2 to the MFP 4 and obtaining the print data as a printed matter.

Figure 2:
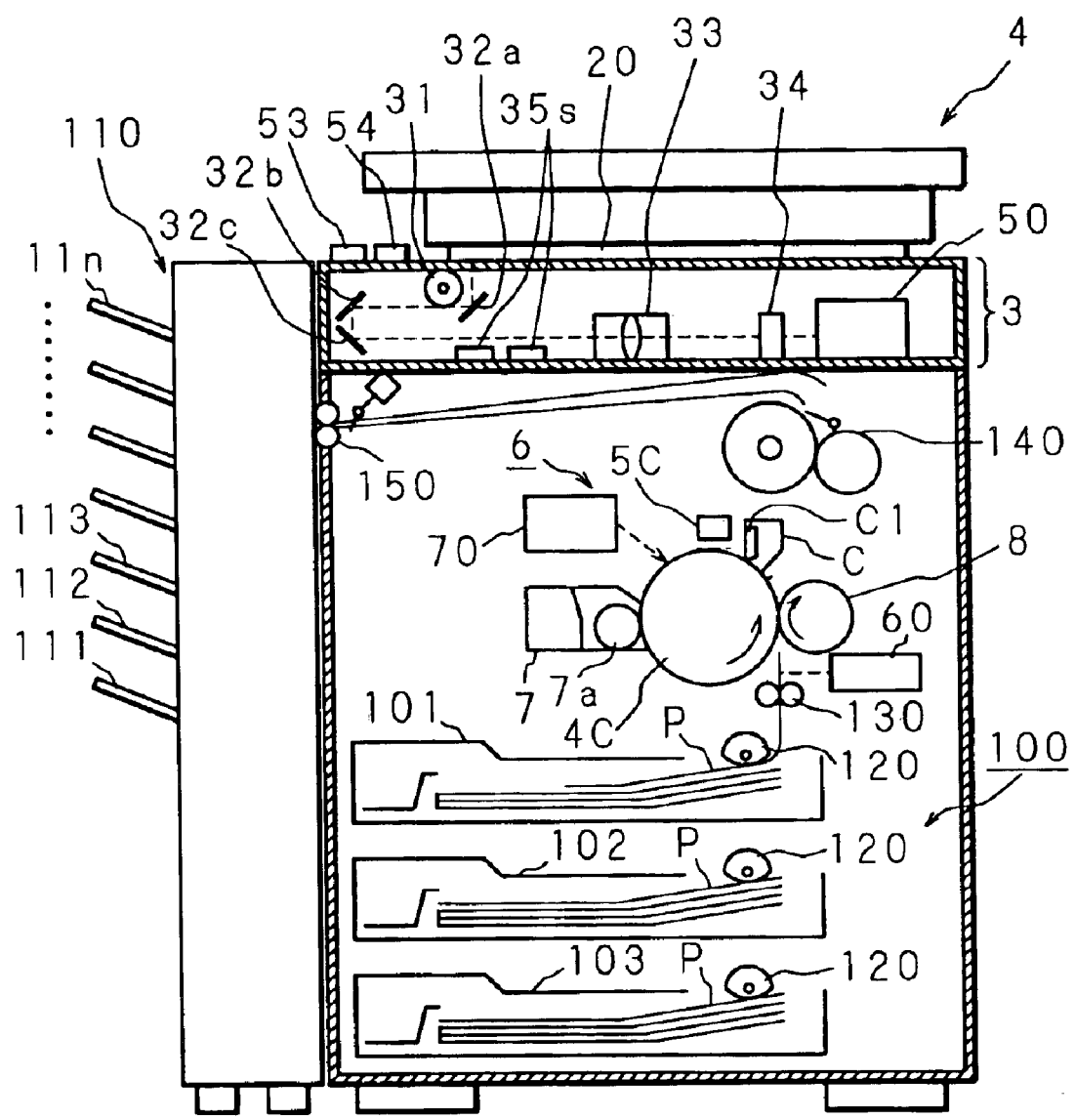
FIG. 2 is a schematic vertical cross sectional view showing the hardware constructions of a multi function printer.
Figure 3:
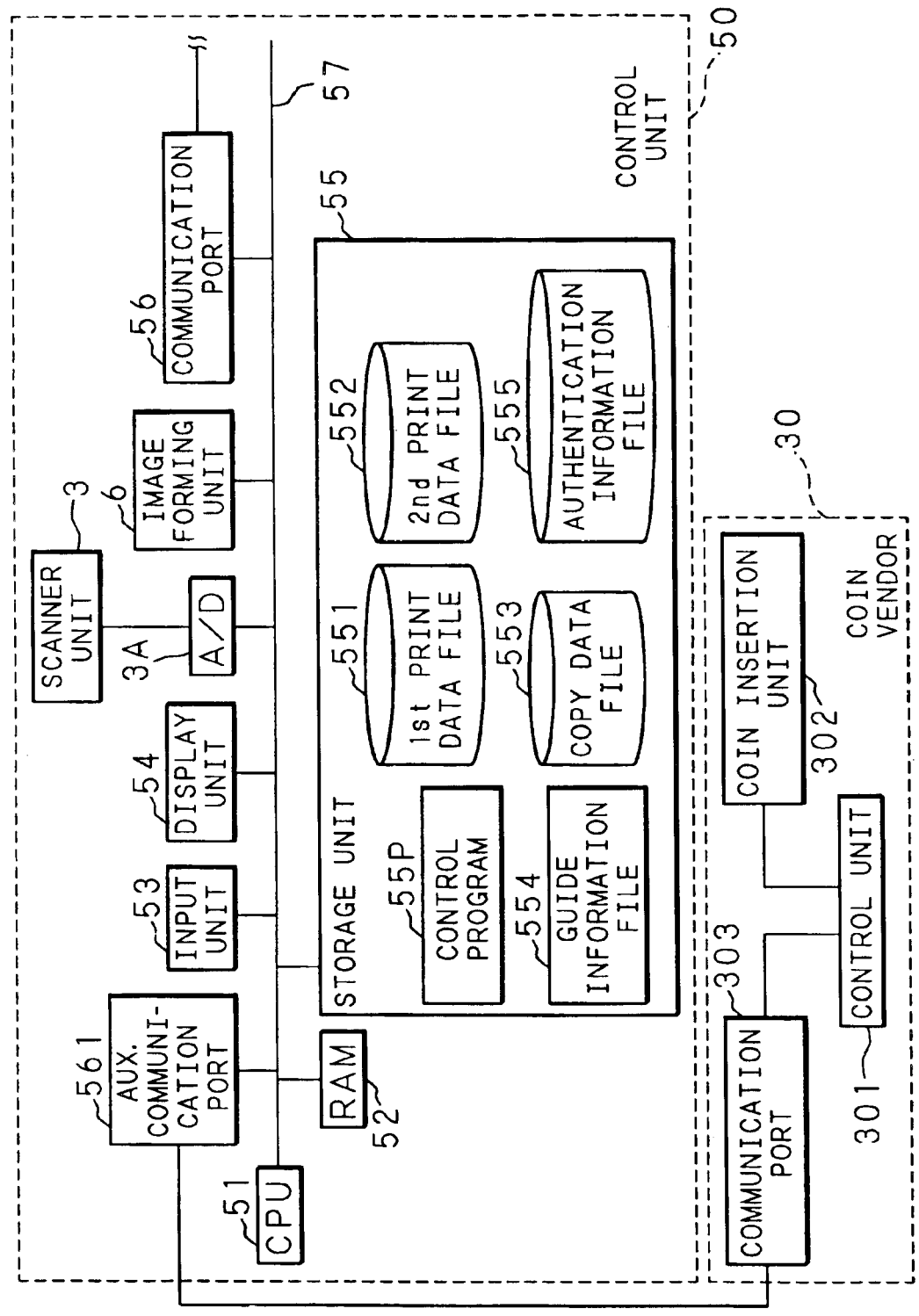
FIG. 3 is a block diagram showing the hardware constructions of the control unit of the multi function printer and coin vendor.
Figure 4:
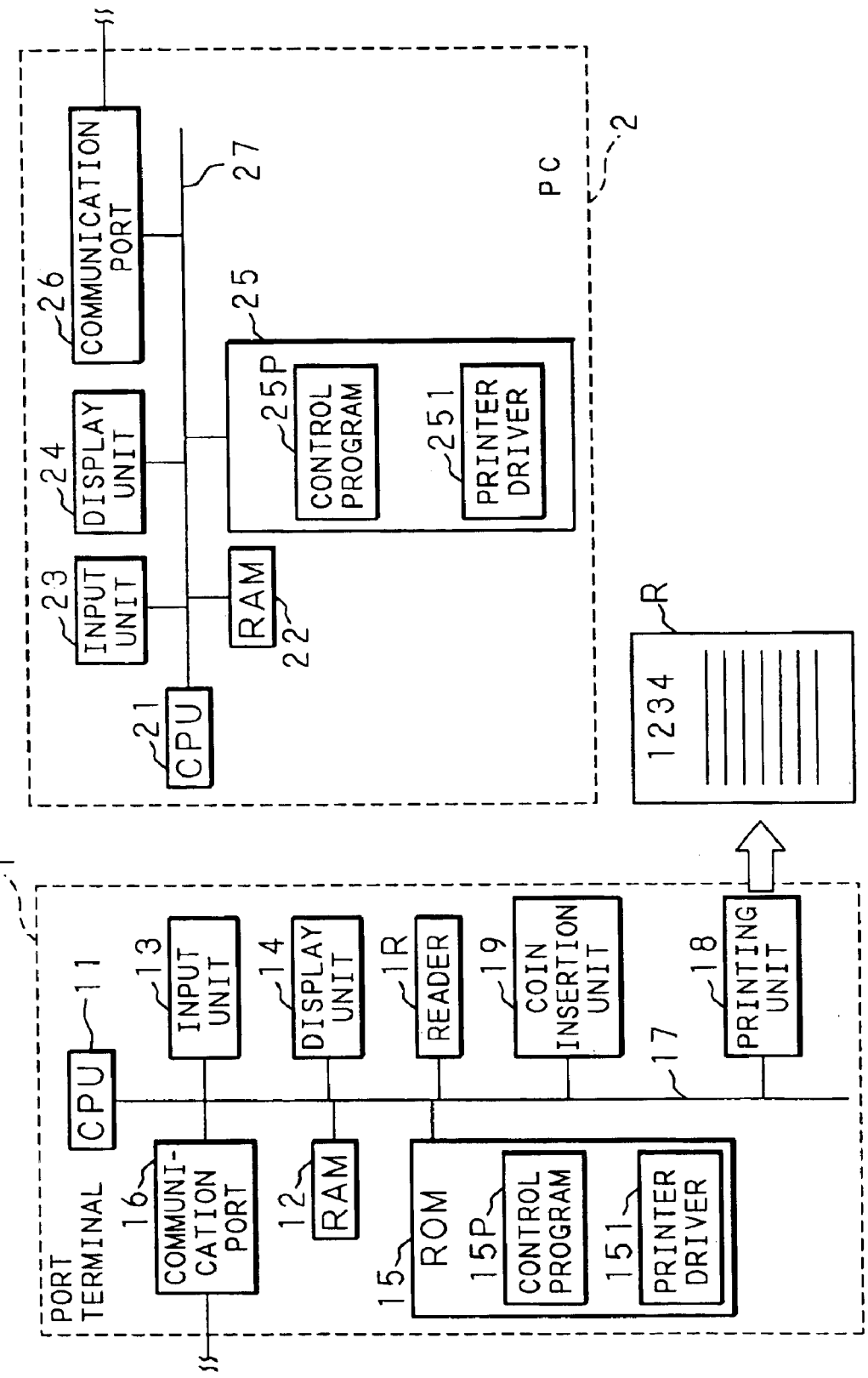
FIG. 4 is a block diagram showing the hardware constructions of a port terminal and a personal computer.

FIG. 2 is a schematic vertical cross sectional view showing the hardware construction of the MFP 4. FIG. 3 is a block diagram showing the hardware constructions of a control unit 50 of the MFP 4 and the coin vendor 30. FIG. 4 is a block diagram showing the hardware constructions of the port terminal 1 and the personal computer 2.

A document platen 20 in the form of a transparent glass body is mounted on the top surface of the MFP 4, and a scanner unit 3 is provided as reading means under the document platen 20. The scanner unit 3 includes an exposure lamp 31, a first reflector mirror 32a, a second reflector mirror 32b, a third reflector mirror 32c, a lens 33, and a photoelectric converting element 34 using a CCD. The scanner unit 3 reciprocates the exposure lamp 31 and the first reflector mirror 32a in the horizontal direction under the document platen 20, thereby exposing and scanning the image of a document placed on the upper surface of the document platen 20 with light irradiated from the exposure lamp 31. Note that a recognition sensor 35s for recognizing the size of document placed on the document platen 20 is provided under the document platen 20.

The reflected light of the exposure lamp 31 is focused onto a light receiving surface of the photoelectric converting element 34 via the first reflector mirror 32a through the third reflector mirror 32c and the lens 33. The photoelectric converting element 34 outputs a signal corresponding to the amount of light received by the light receiving surface. The signal outputted from the photoelectric converting element 34 is converted into a digital signal by an A/D converter 3A of the control unit 50, and stored in a copy data file 553 (see FIG. 3) in a storage unit 55 such as a hard disk (see FIG. 3). Then, according to an operating signal outputted from an operating unit (input unit) 53 such as an operation panel, the image data is read from the copy data file 553 in the storage unit 55 and outputted to an optical scanning device 70.

Next, the construction of the control unit 50 of the MFP 4 shown in FIG. 3 will be explained in detail. As shown in FIG. 3, a RAM (Random Access Memory) 52; the storage unit 55 such as a hard disk; a display unit 54 such as a liquid crystal display serving as displaying means; the input unit 53 as inputting means composed of various input keys such as ten-key, start key and a touch panel provided on the display unit 54, etc. are connected through a bus 57 to a CPU (Central Processing Unit) 51 serving as arithmetic means.

In addition, connected to the CPU 51 are the A/D converter 3A for converting a signal from the photoelectric converting element 34 into a digital signal; a clock unit (not shown) for outputting time information to the CPU 51; an image forming unit 6 for forming an image on recording paper P by irradiating modulated light based on the image data onto a photosensitive member 4C (see FIG. 2); a communication port 56 such as a LAN card for transmitting and receiving information to/from the port terminal 1 and the personal computer 2; and an auxiliary communication port 561 such as RS233C port for transmitting and receiving information to/from the coin vendor 30. The CPU 51 is connected to the above-mentioned various hardware units such as the control unit 50 through the bus 57, controls these hardware units, and executes various software functions, according to a control program 55P stored in the storage unit 55.

Stored in the storage unit 55 are the copy data file 553 storing the image data read by the scanner unit 3; the first print data file 551 storing print data for printing, transmitted from the port terminal 1; and the second print data file 552 storing print data for printing, transmitted from the personal computer 2. Note that a printer function of the MFP 4 that is executed upon a request of a customer from the port terminal 1 will be hereinafter referred to as the first print process (for which the first print data file 551 is used), a printer function of the MFP 4 that is executed upon a request of the shop staff from the personal computer 2 will be hereinafter referred to as the second print process (for which the second print data file 552 is used), and a copy function of the MFP 4 for printing the image data read by the scanner unit 3 will be hereinafter referred to as the third print process (for which the copy data file 553 is used).

Besides, the storage unit 55 stores a guide information file 554 storing the first print information such as a guidance for customers and an operating procedure guide for the first print process; the second print information such as a guidance for shop staff and an operating procedure guide for the second print process; and the third print information such as a guidance and an operating procedure guide for a copy process that is the third print process. These pieces of guide information are suitably read by the CPU 51 and outputted onto the display unit 54 or from a sound output unit (not shown). Furthermore, prepared in the storage unit 55 is an authentication information file 555 that stores authentication information necessary when printing the print data transmitted to the MPF 4 from the personal computer 2 which is used by the shop staff. In the authentication file 555, for example, an authentication number consisting of a plurality of digits is stored as the authentication information. When the authentication information is inputted from the input unit 53, the CPU 51 searches the authentication information file 555 and determines whether or not the inputted authentication information matches the pre-stored authentication information in the authentication information file 555. Only when these pieces of authentication information match, the CPU 51 displays the information related to the second print process and enables access to the print data stored in the second print data file 552.

Next, a toner development process will be explained. As shown in FIG. 2, the photosensitive member 4C is located in substantially the center of the MPF 4 so that it can be freely rotated in the direction of an arrow. For this photosensitive member 4C, for example, a charger 5C such as a conductive brush to which a predetermined voltage is applied is provided so that it can come into contact with the photosensitive member 4C. The surface of the photosensitive member 4C is charged to a predetermined voltage by this charger 5C. Then, image light modulated based on the image data outputted from either the copy data file 553, first print data file 551, or second print data file 552 in the control unit 50 is irradiated onto the photosensitive member 4C from an optical scanning device 70 covered with a shield case, and consequently an electrostatic latent image is formed on the photosensitive member 4C.

Toner is stored in a developer tank 7. The toner is supplied from the developer tank 7 to the surface of the photosensitive member 4C through a development roller 7a. The electrostatic latent image formed on the surface of the photosensitive member 4C is developed by visualizing it into a toner image with the toner supplied from the developer tank 7. Meanwhile, the recording paper P in a paper feed cassette 100 is supplied one sheet at a time into a sheet conveying path by the rotation of a feed roller 120 prior to the rotation of the photosensitive member 4C, and conveyed to a pair of resist rollers 130. Note that, as the paper feed cassette 100, a plurality of paper feed cassettes 101, 102, 103 . . . are provided according to the sizes of recording paper P, and one paper feed cassette 100 corresponding to a size recognized by the recognition sensor 35s, or a size of recording paper P inputted by a customer from the input unit 53, is selected.

The recording paper P is stopped in a state in which the front end thereof is in contact with the contact line of the pair of resist rollers 130, and, when the pair of resist rollers 130 are started to rotate at a predetermined timing, the recording paper P is guided in the direction of the photosensitive member 4C. Then, the toner image carried on the photosensitive member 4C is transferred to the surface of the recording paper P by a transfer device 8 to which a predetermined transfer bias is applied. A fixing process is performed by applying heat and pressure to the recording paper P to which the toner image has been transferred while the recording paper P is passing through fixing rollers 140. Consequently, the toner of the toner image is fused and fixed to the lower surface of the recording paper P.

The recording paper P with the toner image fixed thereto is conveyed by paper discharge rollers 150 and discharged to one of multi-stage paper discharge trays 110 (111, 112, . . . 11n). However, in the case of double-side copying, after the image is formed on one surface (front surface), the recording paper P is conveyed to the resist rollers 130 again from the fixing rollers 140, and image formation for the back side is started at a predetermined timing. Note that the toner remaining on the photosensitive member 4C is removed by a cleaning blade C1 of a cleaner C. In this embodiment, the image forming unit 6 for single color (black) is illustrated to simplify the explanation. However, in the case where the MFP 4 is a color copying machine, similar image forming units 6 for at least the three primary colors, specifically cyan, magenta and yellow, are provided in tandem.

Next, the coin vendor 30 will be explained. As shown in FIG. 3, the coin vendor 30 is composed of a control unit 301, a communication port 303, and a coin insertion unit 302. The coin insertion unit 302 is an inlet for receiving inserted coins. The control unit 301 determines whether the coins inserted from the coin insertion unit 302 are genuine or forged coins, and transmits the information (valuable information) of the insertion of coins to the CPU 51 of the control unit 50 of the MFP 4 through the communication port 303. In this embodiment, the valuable information is outputted on condition that the valuable information is recognized by the control unit 301 of the coin vendor 30. However, the present invention is not limited to this construction, and the CPU 51 of the control unit 50 of the MFP 4 may access the control unit 301 of the coin vendor 30 at a fixed cycle and obtain the valuable information. Moreover, in this embodiment, although coins are inserted, it is possible to use a reader/writer capable of accessing a recording medium such as a prepaid card or an IC card storing valuable information or capable of transacting the valuable information, in place of the coin insertion unit 302.

Next, the hardware construction of the port terminal 1 will be explained. As shown in FIG. 4, connected to a CPU 11 through a bus 17 are a RAM 12; a ROM 15; a communication port 16 such as a LAN card for transmitting and receiving information to/from the MFP 4; a display unit 14 such as a liquid crystal display; an input unit 13 having a touch panel and a keyboard; a reader 1R; a coin insertion unit 19; and a printing unit 18. The CPU 11 is connected to the above-mentioned various hardware units of the port terminal 1 through the bus 17, controls these hardware units, and executes various software functions, according to a control program 15P stored in the ROM 15.

In addition, a printer driver 151 for MFP 4 is installed in the ROM 15. Printing using the port terminal 1 is executed when a customer operates the input unit 13 to output to the MFP 4 the print data downloaded from a network album of the Web server 5, or the print data read from a recording medium such as a CD-ROM and a memory card inserted into the reader 1R. After the print data is outputted to the MFP 4, unique identification information, for example, a four-digit secret identification number or a barcode, for specifying print data is outputted from the printing unit 18 serving as identification information outputting means and printed on a receipt R serving as recording paper. Note that the output of identification information is not limited to the method in which the identification information is outputted by being printed on the receipt R, and it may be possible to employ a method in which the identification information is only displayed on the display unit 14, or the identification information is transmitted to a mobile phone (not shown) or a PDA (Personal Digital Assistant, not shown) of a customer by means of communication such as an infrared communication unit or Bluetooth (not shown).

Next, the hardware construction of the personal computer 2 will be explained. As shown in FIG. 4, the personal computer 2 has a configuration similar to a typical general purpose computer, and can output data, such as HTML (Hyper Text Markup Language) data displayed on a browser, document data created by word processing software and text data received by a mailer, as the print data to the MFP 4 and print the data.

As shown in FIG. 4, connected to a CPU 21 through a bus 27 are a RAM 22; a storage unit 25 such as a hard disk; a communication port 26 such as a LAN card for transmitting and receiving information to/from the MFP 4; a display unit 24 such as a liquid crystal display; and an input unit 23 having a keyboard and a mouse. The CPU 21 is connected to the above-mentioned various hardware units of the personal computer 2 through the bus 27, controls these hardware units, and executes various software functions, according to a control program 25P stored in the ROM 25. In addition, a printer driver 251 for MFP 4 is installed in the ROM 25.

Figure 5:
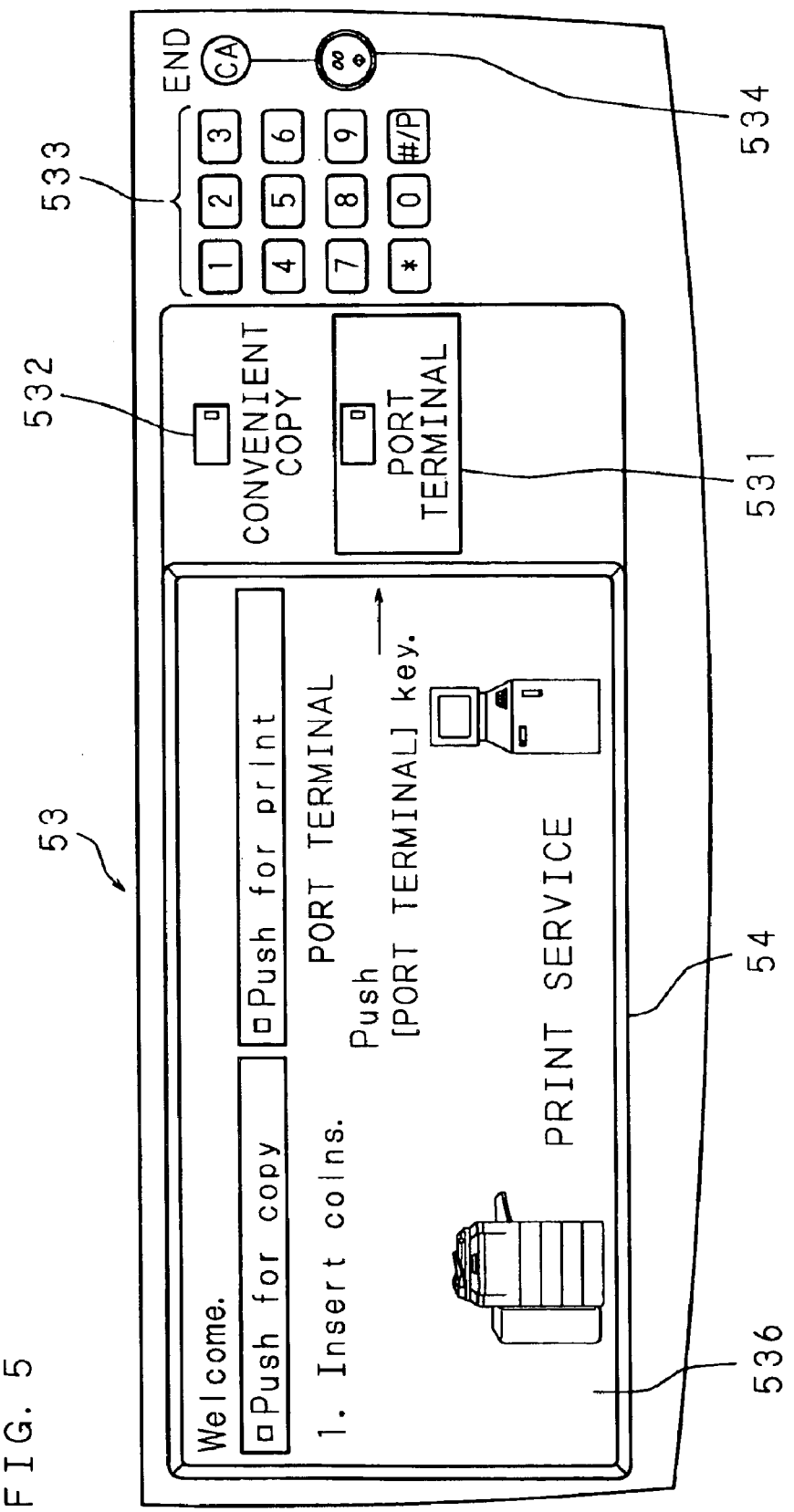
FIG. 5 is a schematic view showing the appearance of the display unit and input unit of the multi function printer.

FIG. 5 is a schematic view showing the appearance of the display unit 54 and input unit 53 of the MFP 4. The input unit 53 comprises a touch panel 536 stacked on the display unit 54, a ten-key 533, and the like. The display state of the display unit 54 in FIG. 5 shows a state in which a customer can simultaneously recognize both the information related to the copy process (the third print information) and the information related to the first print process for customers (the first print information). According to a printing system of the present invention, when there is no print process command from the port terminal 1, only the information related to the copy process is displayed, and, only when there is a print process command from the port terminal 1 and the copy process is not being performed, the information related to the copy process and the information related to the first print process are displayed as shown in FIG. 5. Further, by inputting authentication information from the ten-key 533, the information related to the second print process for shop staff (the second print process information) is displayed on the display unit 54.

The following description will explain a printing method of the present invention, i.e., the processes performed by the printing system and the MFP (image forming apparatus) of the present invention.

Figures 6A, 6B:
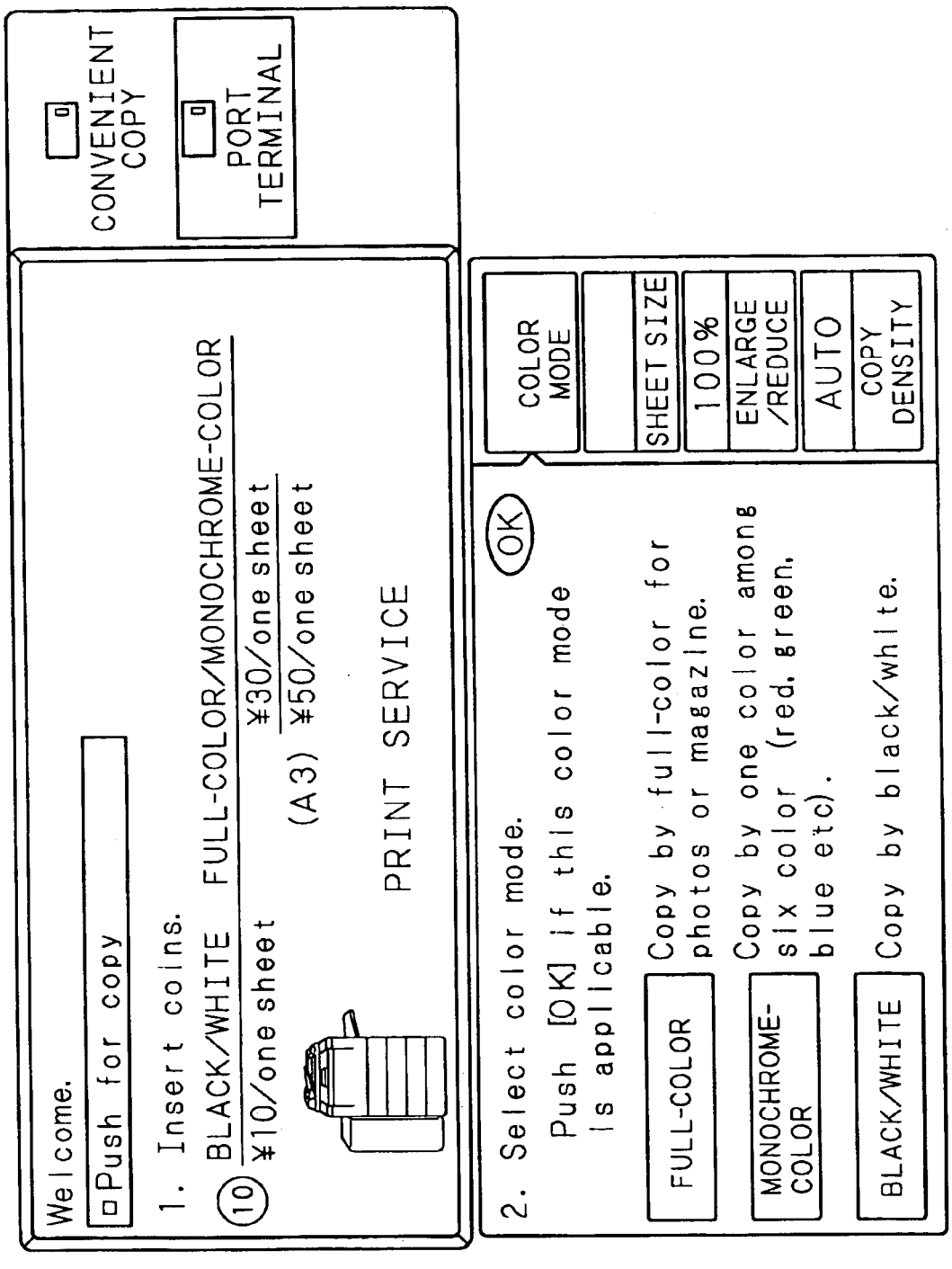
FIG. 6A and FIG. 6B are schematic views showing the display state of the display unit of the multi function printer, for guiding the procedure of copy process.

First, a process performed when a copy process command is received by the MFP 4 will be explained. FIG. 6A and FIG. 6B through FIG. 14 are schematic views showing the display state of the display unit 54 of the MFP 4, for guiding the procedure of copy process. FIG. 6A shows a standby state of the copy process when there is no print process command from the port terminal 1. In the standby state shown in FIG. 6A or a state in which a print process command is received from the port terminal 1 as shown in FIG. 5, when a predetermined amount of money is inserted from the coin insertion unit 302 of the coin vendor 30, the valuable information is transmitted from the control unit 301 to the CPU 51. In this case, a color mode screen shown in FIG. 6B is displayed. The customer inputs either "black-and-white", "full-color", or "monochrome-color" from the touch panel 536. FIG. 7A shows a state in which "full-color" is selected, and FIG. 7B shows a state in which "monochrome-color" is selected. When "monochrome-color" is selected as shown in FIG. 7B, the information about monochrome-color such as red and green is displayed on the display unit 54. Note that the information about a sequence of copy processes displayed on the display unit 54 is stored in the guide information file 554 as described above, and the CPU 51 reads a suitable file and outputs it to the display unit 54, according to an instruction from the input unit 53.

Figure 8A:
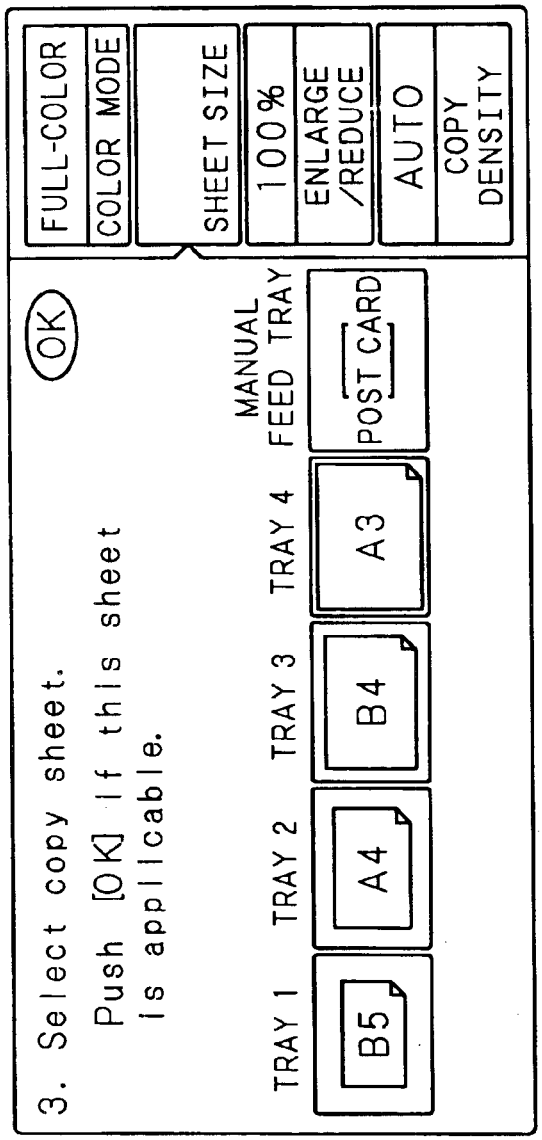
FIG. 8A and FIG. 8B are schematic views showing the display state of the display unit of the multi function printer, for guiding the procedure of copy process.
Figure 8B:
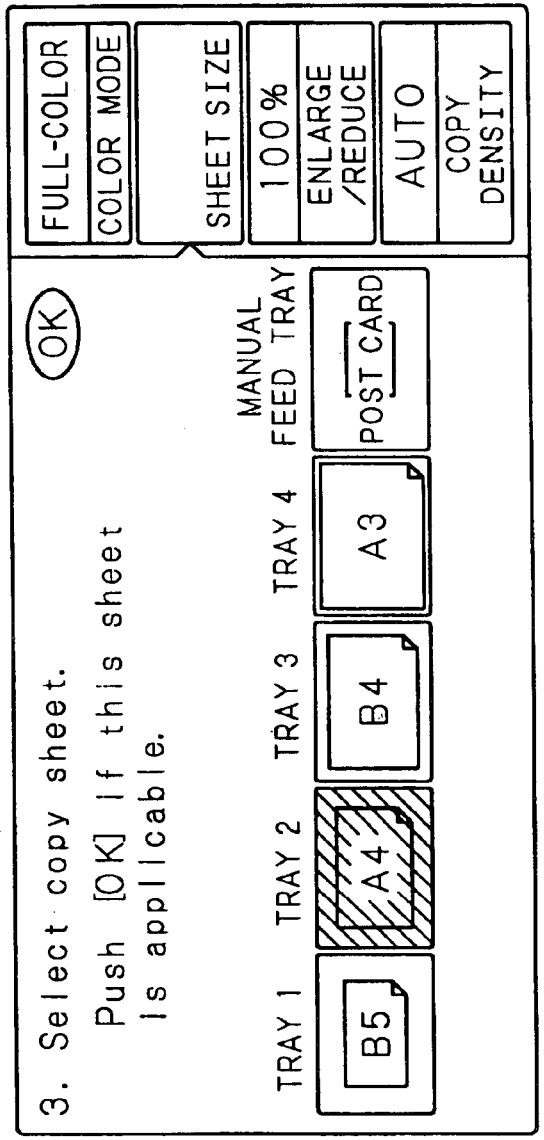
Figure 9A:
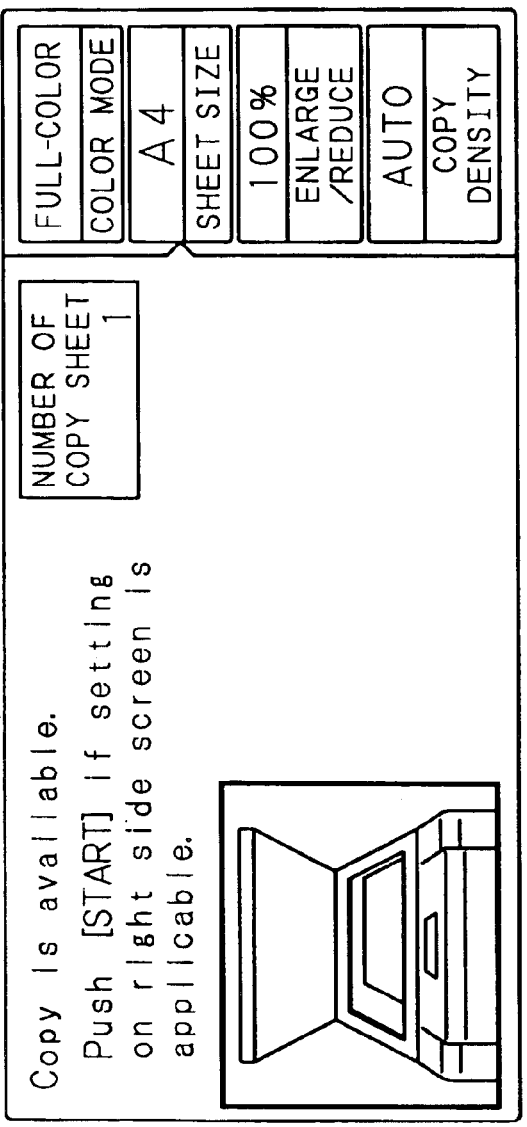
FIG. 9A and FIG. 9B are schematic views showing the display state of the display unit of the multi function printer, for guiding the procedure of copy process.
Figure 9B:
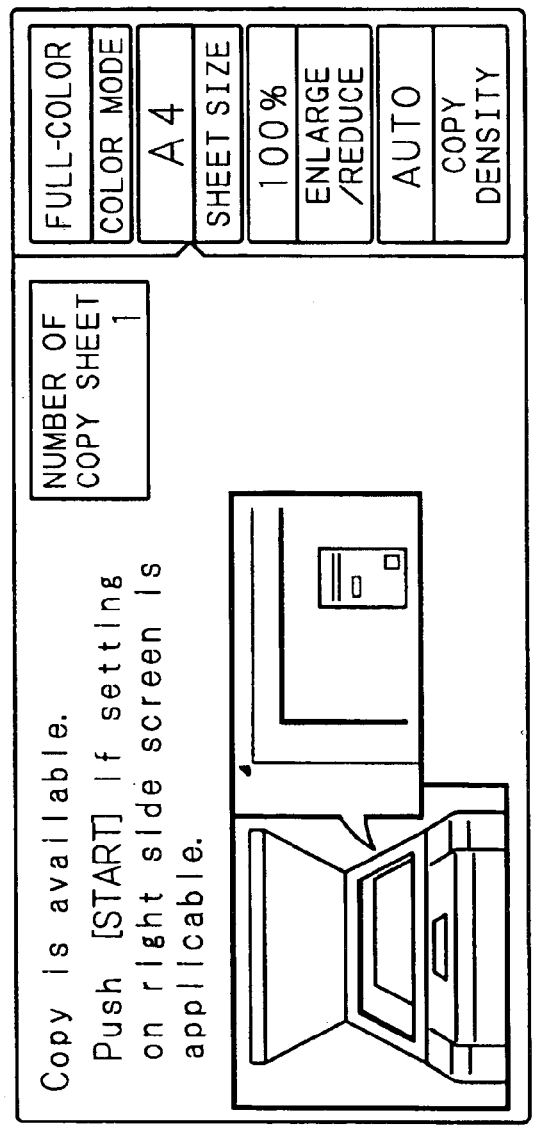

When the selection of a color mode is completed, a sheet selection menu is displayed next as shown in FIG. 8A. The customer selects a desired size of sheet for copying through the touch panel 536. Note that the example shown in FIG. 8B is a state in which an A4-size sheet is selected. Consequently, a guide screen indicating that preparation for copying has been completed is displayed as shown in FIG. 9A and FIG. 9B. Here, when the customer presses a "start" button 534 of the input unit 53, copying is started and a message indicating that copying is in progress is displayed as shown in FIG. 10A. If an enlarged/reduced copy is desired, the customer selects the "enlarge/reduce" button displayed on the display unit 54 through the touch panel 536. With this operation, a screen for selecting a magnification ratio is displayed as shown in FIG. 10B. Moreover, if the customer wishes to set a copy density, he/she operates the "copy density" button and the buttons displayed on the display unit 54 from the touch panel 536. With this operation, a guidance for density setting is displayed as shown in FIG. 11A. As shown in FIG. 11A, the customer can input a type of document among "text", "photo", "map", and "automatic" so as to set an appropriate density according to the type of a document. In addition, in order to enable a minute adjustment of density, densities may be expressed in numerical values indicating several levels (density level 5 is the darkest level and density level 1 is the lightest level), and the customer may select a desired density. In this case, the customer may input a numerical value corresponding to a density from the touch panel 536 or the ten-key 533.

When the customer operates a "convenient copy" button 532 shown in FIG. 5, a convenient copy mode shown in FIG. 11B is displayed. In the convenient copy mode, it is possible to select two types of special copy, namely, "border erase" and "repeat image" mode. The "border erase" mode is used to eliminate shades generated around a document when a thick document or a document such as a book is copied. If the "border erase" mode is desired, the customer selects a "border erase" button on the touch panel 536 as shown in FIG. 12A. On the other hand, the "repeat image" button is provided to repeatedly make a plurality of copies of one piece of photograph on one sheet, and, as shown in FIG. 12A, the sheet is equally divided into two parts or four parts and the same photograph is copied onto the respective parts.

Figure 13A:
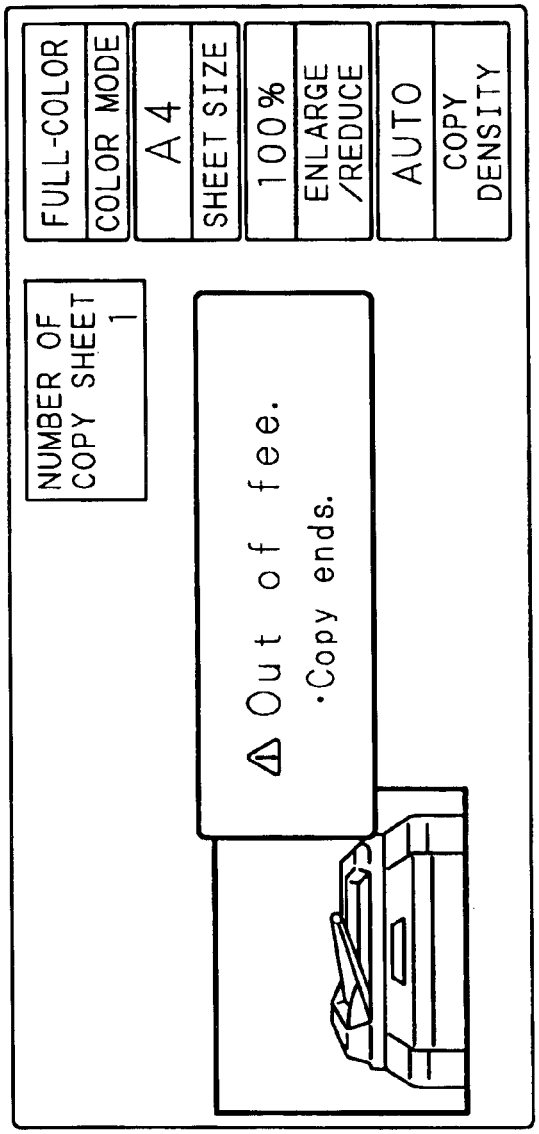
FIG. 13A and FIG. 13B are schematic views showing the display state of the display unit of the multi function printer, for guiding the procedure of copy process.
Figure 13B:
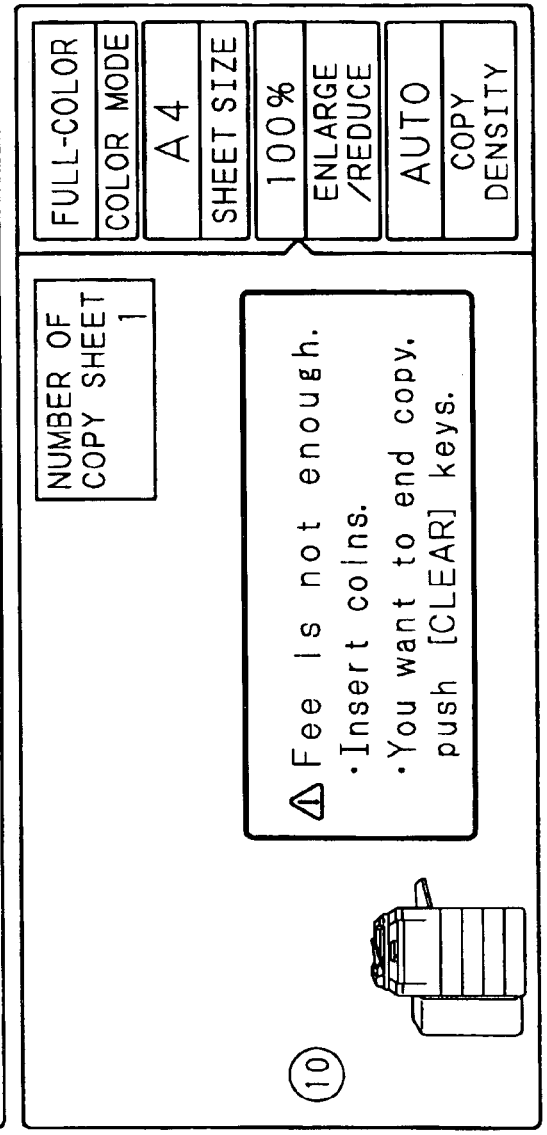

As shown in FIG. 5 or FIG. 6A, a copy process command is started when the valuable information from the control unit 301 of the coin vendor 30 is inputted to the CPU 51. In this embodiment, ¥10 per sheet is set for black-and-white copy, and ¥30 per sheet is set for full-color or monochrome-color copy (¥50 for A3-size sheet). After completion of one copying, the CPU 51 subtracts an amount corresponding to the value equivalent to copying performed in each mode from the inserted amount of money, and, when the remainder becomes ¥0, the CPU 51 displays information indicating running out of payment on the display unit 54 as shown in FIG. 13A. Besides, when the remaining amount becomes less than a minimum required charge during copying in the color mode, the CPU 51 displays information indicating lack of payment on the display unit 54 as shown in FIG. 13B.

Figure 14:
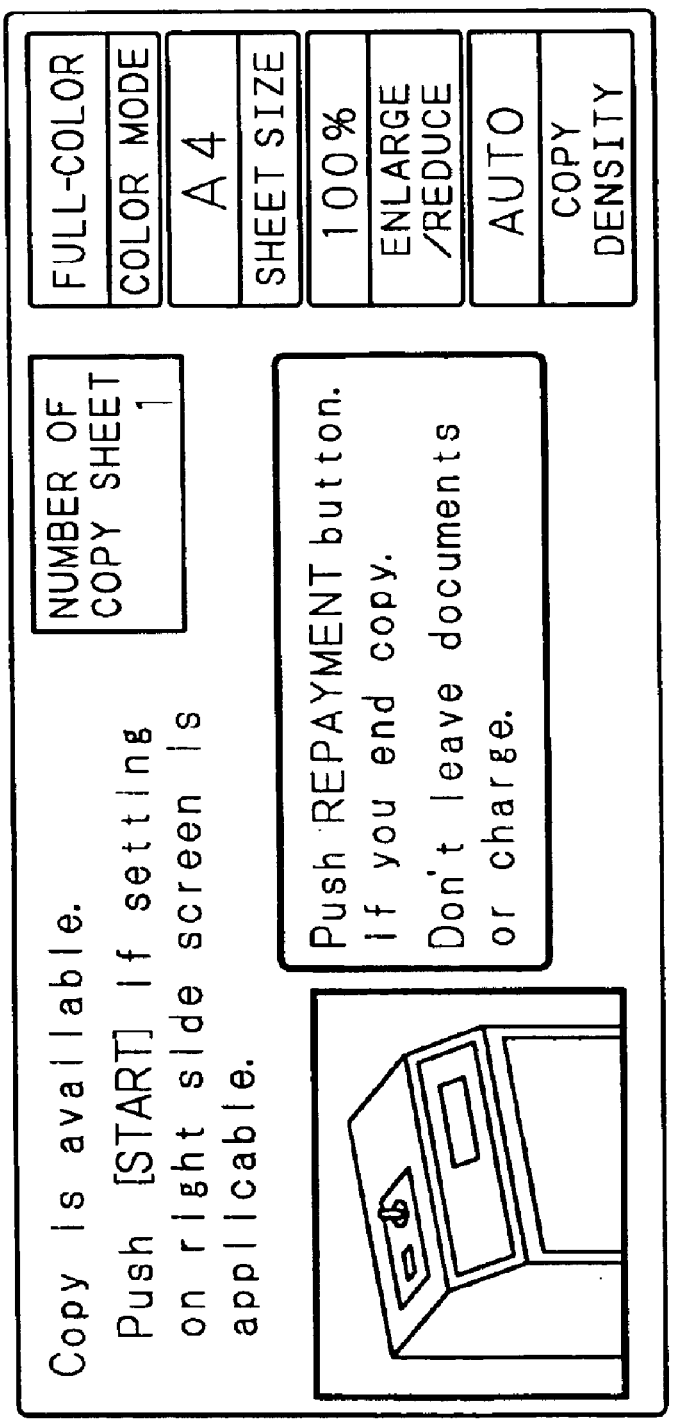
FIG. 14 is a schematic view showing the display state of the display unit of the multi function printer, for guiding the procedure of copy process.

The "lack of payment" means, for example, a state in which the remainder becomes ¥20 or ¥10 though a minimum required amount for color copy is set at ¥30. In the case of running out of payment or lacking payment, if the customer inserts a predetermined amount of coins from the coin insertion unit 302, the valuable information is transmitted to the MFP 4 again, and it becomes possible to continue the copying operation. When the customer has completed copying, a warning reminding the customer not to forget to take the document and the change is displayed on the display unit 54 as shown in FIG. 14. Until the copy process command has been executed and completed, the CPU 51 of the MFP 4 displays only the information related to the copy process command in the entire area of the display unit 54 as shown in FIG. 6A through FIG. 14 even when a first print process command is inputted from the port terminal 1, or a second print process command is inputted from the personal computer 2. Accordingly, even when a print process command is instructed by another customer during copying, the MFP 4 can perform the copy process without disturbing the copying operation of the customer.

Next, the following description will explain a process to be performed after the transmission of the first print process command from the port terminal 1. The print data obtained from the Web server 5 or the like is transmitted to the MFP 4 after adding unique identification information to the print data. The CPU 51 of the MFP 4 stores the transmitted print data in the first print data file 551 in association with the identification information. FIG. 15 is an explanatory view showing the record layout of the first print data file 551 in which the received date, the file name of print data, history, etc. are stored in association with the identification information. In the received date field, the information about the date at which the CPU 51 received print data from the port terminal 1 and wrote the print data in the first print data file 551 is stored. In the print data (file name) field, print data, such as document data, image data and html data, transmitted from the port terminal 1 is stored. In the identification information field, four-digit unique identification information is stored in association with the print data. In the history field, the information indicating whether or not the first print process has already been completed is stored, and more specifically, "Completed" indicating that the printing has already been completed, or "Not Completed" indicating that the print process has not yet been completed and is on standby as a job, is stored as the history.

When the copy process is not being executed and new print data is stored in the print data file 551 by receiving the first print process command from the port terminal 1, as shown in FIG. 5, the information related to the copy process and the information related to the first print process are equally displayed with a substantially the center of the display unit 54 as the boundary. Here, when the customer inputs the "port terminal" button 531, the guide for the first print process is started.

FIG. 16A and FIG. 16B through FIG. 19A and FIG. 19B are schematic views showing the display state of the display unit 54 of the MFP 4, for guiding the procedure of first print process.

Figure 16A:
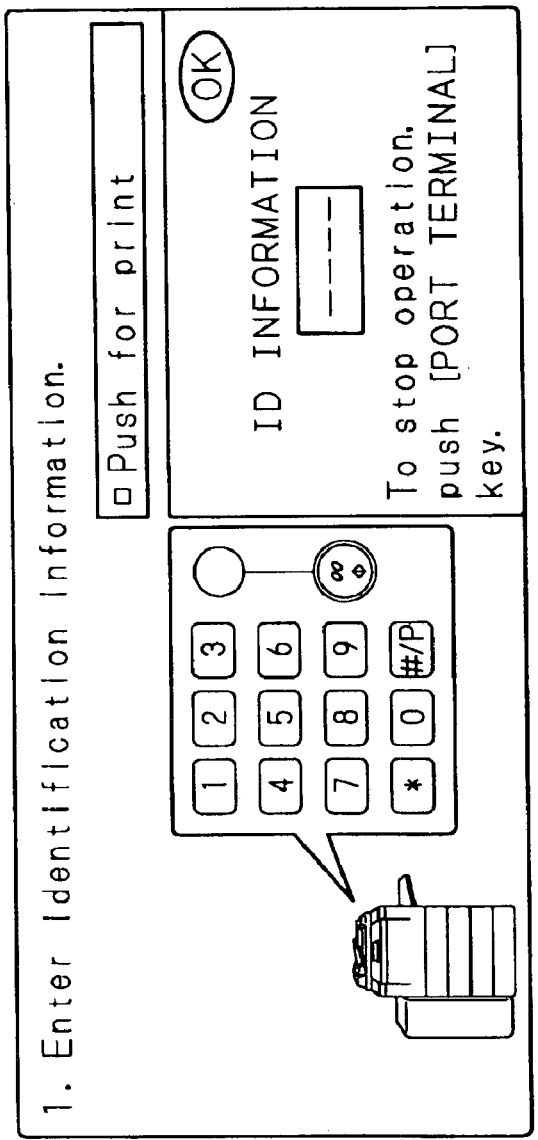
FIG. 16A and FIG. 16B are schematic views showing the display state of the display unit of the multi function printer, for guiding the procedure of first print process.
Figure 16B:
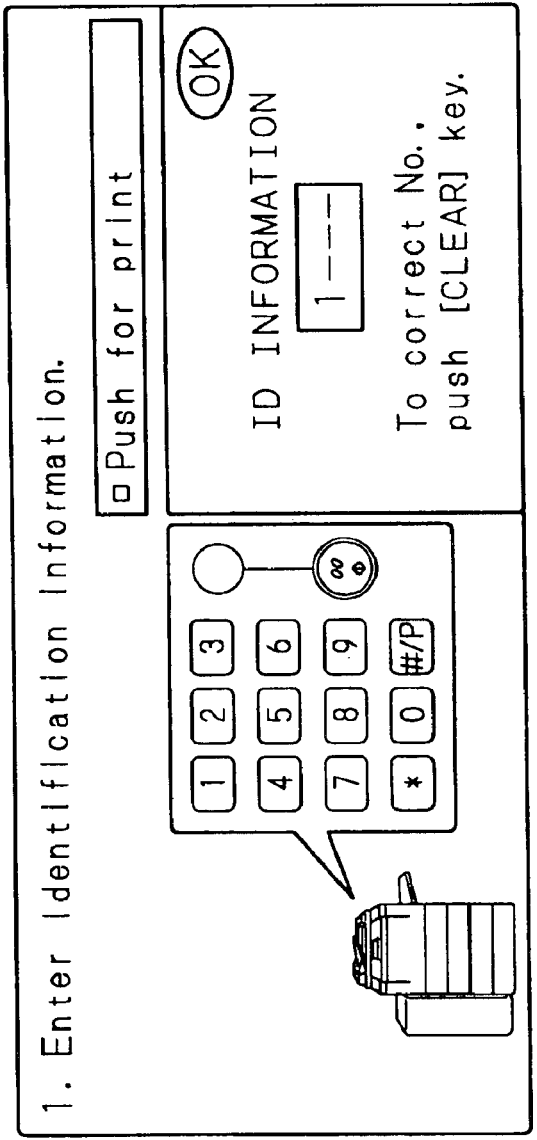
Figure 17A:
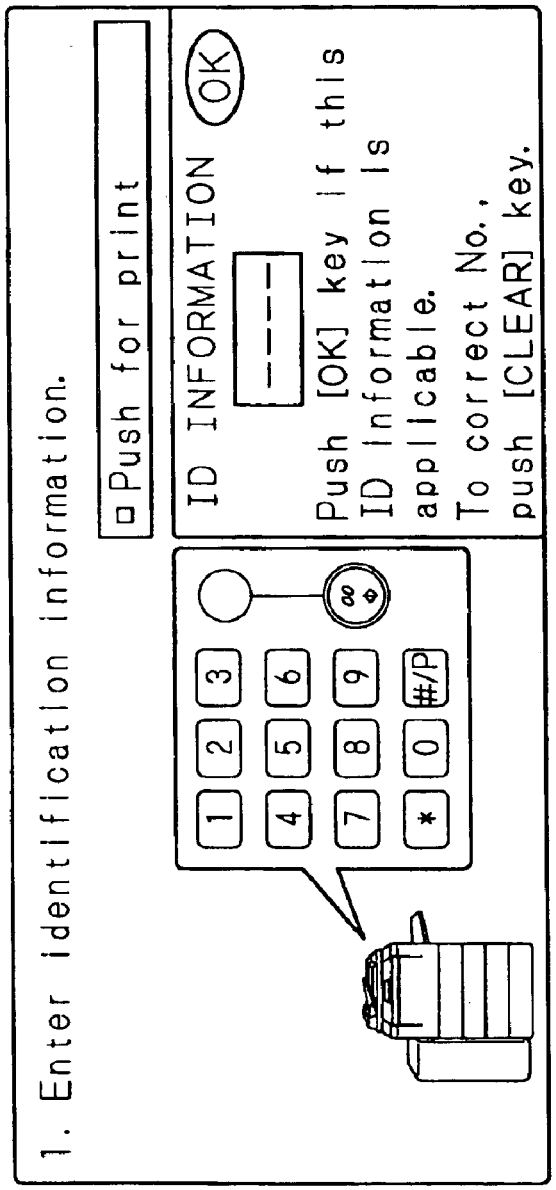
FIG. 17A and FIG. 17B are schematic views showing the display state of the display unit of the multi function printer, for guiding the procedure of first print process.

When the "port terminal" button 531 is operated in the state in which the information related to the copy process and the information related to the first print process are displayed, only the first print information related to the first print process is displayed on the display unit 54 as shown in FIG. 16A, and a screen requesting an input of identification information is displayed first. On this screen, the customer inputs the identification information printed on the receipt R outputted from the printing unit 18 of the port terminal 1 by operating the ten-key 533. With this operation of the ten-key 533 by the customer, the identification information is displayed as shown in FIG. 16B. When the input of identification information has been completed, the customer operates the "OK" button displayed on the display unit 54 as shown in FIG. 17A from the touch panel 536. In this embodiment, although the input of identification information is received from the ten-key 533 serving as identification information receiving means, the present invention is not limited to this, and it may possible to provide a barcode reader as the identification information receiving means and causes the barcode reader to read a barcode printed as identification information on the receipt R. Alternatively, it may be possible to provide the MFP 4 with an infrared receiving unit having an infrared communication function (not shown) or a communication module having Bluetooth function (not shown) and transmit and receive the identification information to/from a mobile phone (not shown).

Figure 17B:
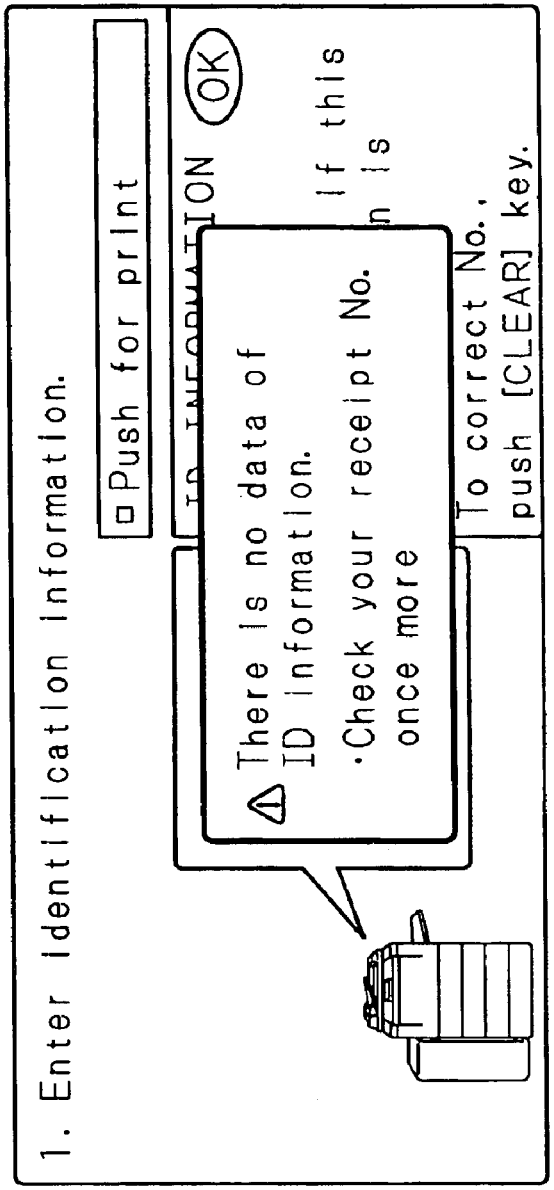
Figure 19A:
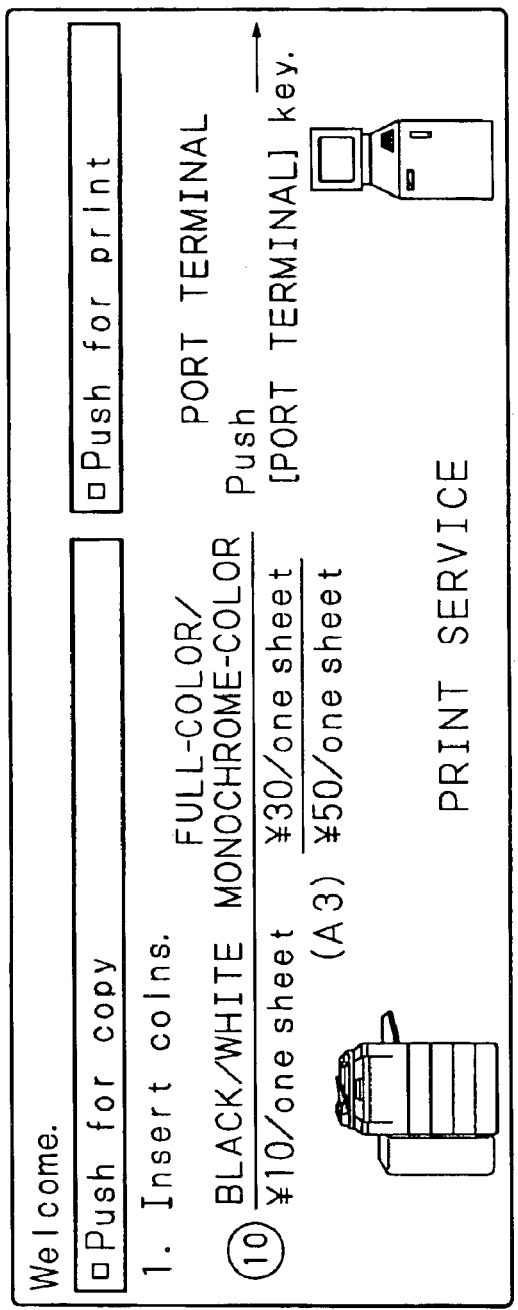
FIG. 19A and FIG. 19B are schematic views showing the display state of the display unit of the multi function printer, for guiding the procedure of first print process.
Figure 19B:
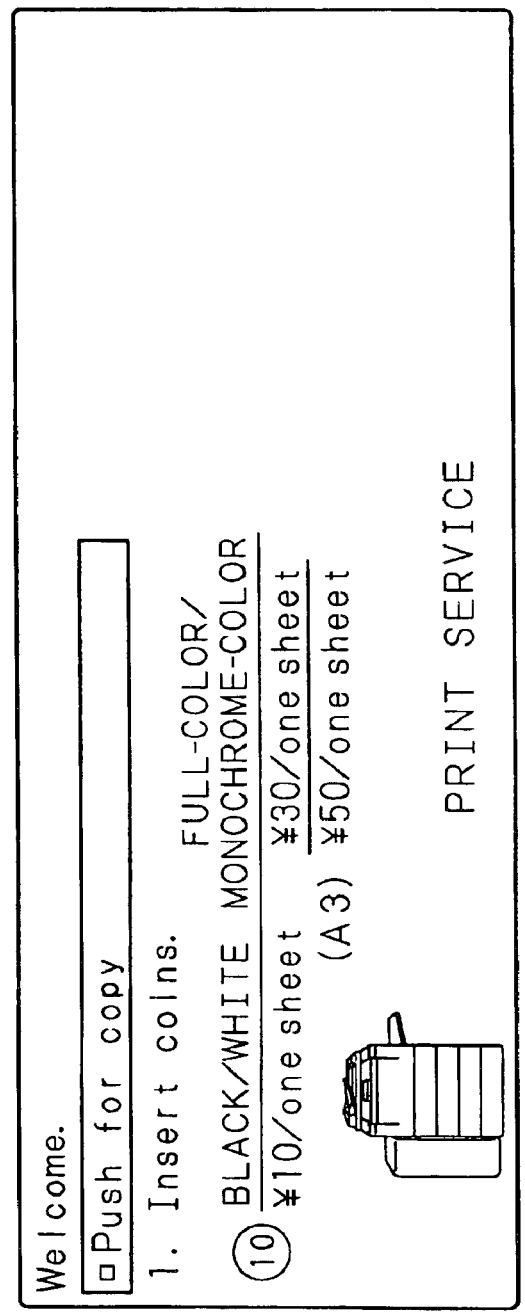

The CPU 51 searches the first print data file 533 based on the inputted identification information, and reads the corresponding print data and starts to print out the print data. On the other hand, when there is no corresponding identification information in the first print data file 533, as shown in FIG. 17B, the CPU 51 displays guide information indicating the absence of identification information on the display unit 54. Note that the information related to the first print process is stored in the guide information file 554 similarly to the information related to the copy process, and the CPU 51 reads a corresponding file at suitable timing and outputs it to the display unit 54. After the first print process is started, guide information indicating that printing is in progress is displayed as shown in FIG. 18A, and, after the printing is completed, guide information indicating that printing has been completed is displayed as shown in FIG. 18B. Then, if the CPU 51 has received another first print process command, i.e., if there is print data with "Not Completed" shown in the history field of the first print data file 551, the CPU 51 displays the information related to the first print process and the information related to the copy process as shown in FIG. 19A. On the other hand, if the CPU 51 has not received another first print process command, i.e., if there is no print data with "Not Completed" in the history field of the first print data file 551, the CPU 51 displays only the information related to the copy process on the display unit 54 as shown in FIG. 19B.

Next, the following description will explain the procedure of displaying the information related to the second print process for shop staff. FIG. 20A and FIG. 20B through FIG. 22 are schematic views showing the display state of the display unit 54 of the MFP 4 for guiding the procedure of second print process. When a second print process command is outputted from the personal computer 2, the print data is transmitted from the personal computer 2 to the MFP 4. The CPU 51 of the MFP 4 receives the print data transmitted from the personal computer 2 and stores it in the second print data file 552. When the MFP 4 receives second print process command, the information related to the second print process is not displayed on the display unit 54 as shown in FIG. 5 or 6A. The reason for this is to prevent customers from printing the print data of the shop staff by mistake.

Figure 20A:
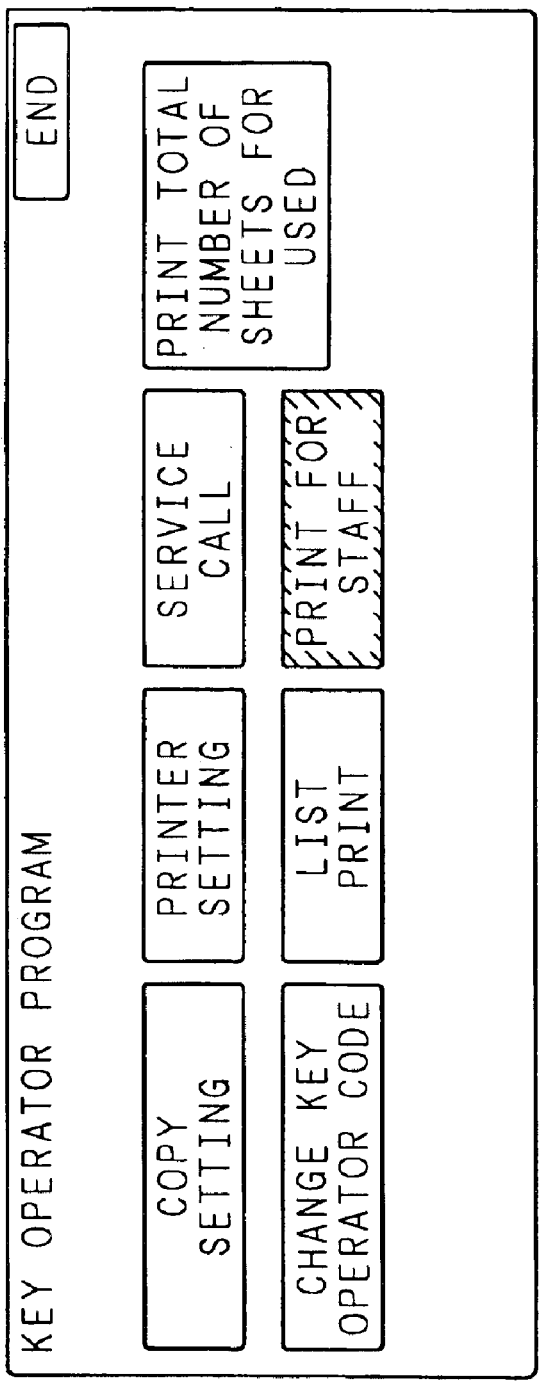
FIG. 20A and FIG. 20B are schematic views showing the display state of the display unit of the multi function printer, for guiding the procedure of second print process.

When the shop staff inputs authentication information from the input unit 53 at the time the copy process or the first print process has not been started, the CPU 51 compares the pre-stored authentication information (for example, four-digit secret identification number or biological information such as fingerprint) in the authentication information file 555 and the inputted authentication information. When these pieces of authentication information match, the CPU 51 reads the screen data shown in FIG. 20A from the guide information file 554 and displays it. In this embodiment, a plurality of digits (authentication information) is inputted by the ten-key 533, but, in the case of using fingerprint information, a scanner for reading a fingerprint, not shown, may be prepared. If the authentication is approved, as shown in FIG. 20A, a screen is displayed to allow a selection of a mode for setting the details of the MFP 4, a mode for printing the print data for shop staff, or other mode.

Figure 20B:
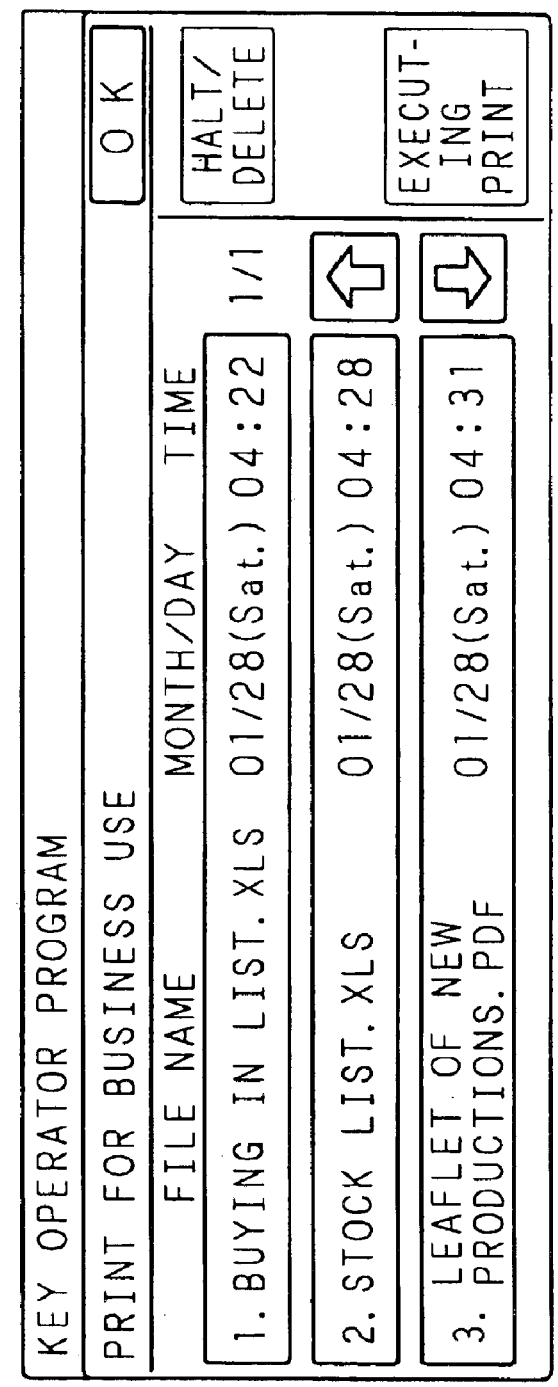

The "copy setting" button and the "printer setting" button are the buttons for making detailed settings such as changing the settings of copying fees and setting a transition time to a power save mode. The "service call" button is the button to be operated when ordering sheets, when the MFP 4 is broken down, or other situations. Moreover, the "print for staff" button is the button to be used when displaying a list of the second print data outputted from the personal computer 2 to the MFP 4. When the "print for staff" button on the touch panel 536 is operated, as shown in FIG. 20B, the print jobs about the second print data are displayed as the second print information on a list. This list of print jobs is read from the second print data file 552 and displayed.

FIG. 23 is an explanatory view showing the record layout of the second print data file 552. As shown in FIG. 23, the received date, the file name of print data, history, etc. are stored in association with the identification information. In the received date field, the information about the date at which the CPU 51 received print data from the personal computer 2 and wrote the print data in the second print data file 552 is stored. In the print data (file name) field, the print data, such as document data, image data and html data, transmitted from the personal computer 2 is stored. In the history field, the information indicating whether or not the second print process has already been completed, and more specifically, "Completed" indicating that the printing has already been completed, or "Not Completed" indicating that the print process has not yet been completed and is on standby as a job, is stored as the history.

When the "print for staff" button is operated, the CPU 51 refers to the history field, reads the file names of print data stored with "Not Completed" from the second print data file 552 and displays them as shown in FIG. 20B. Note that print data which has already been printed may also be listed and displayed together with the history on the display unit 54. The shop staff operates the touch panel 536 to select a desired job to be printed from the displayed list as shown in FIG. 21A. Here, if the shop staff selects and inputs the "print execution" button on the touch panel 536, the second print process is started, and information indicating that printing is in progress is displayed as shown in FIG. 21B.

After the printing is completed, if the CPU 51 has received another second print process command, i.e., if there is print data with "Not Completed" shown in the history field of the second print data file 552, the CPU 51 displays the information related to the second print process as shown in FIG. 22. On the other hand, if the CPU 51 has not received another second print process command, i.e., if there is no print data with "Not Completed" shown in the history field of the second print data file 552, the CPU 51 displays the information related to the copy process and the information related to the first print process on the display unit 54 as shown in FIG. 5, or the information related to the copy process on the display unit 54 as shown in FIG. 6A.

Figure 24:
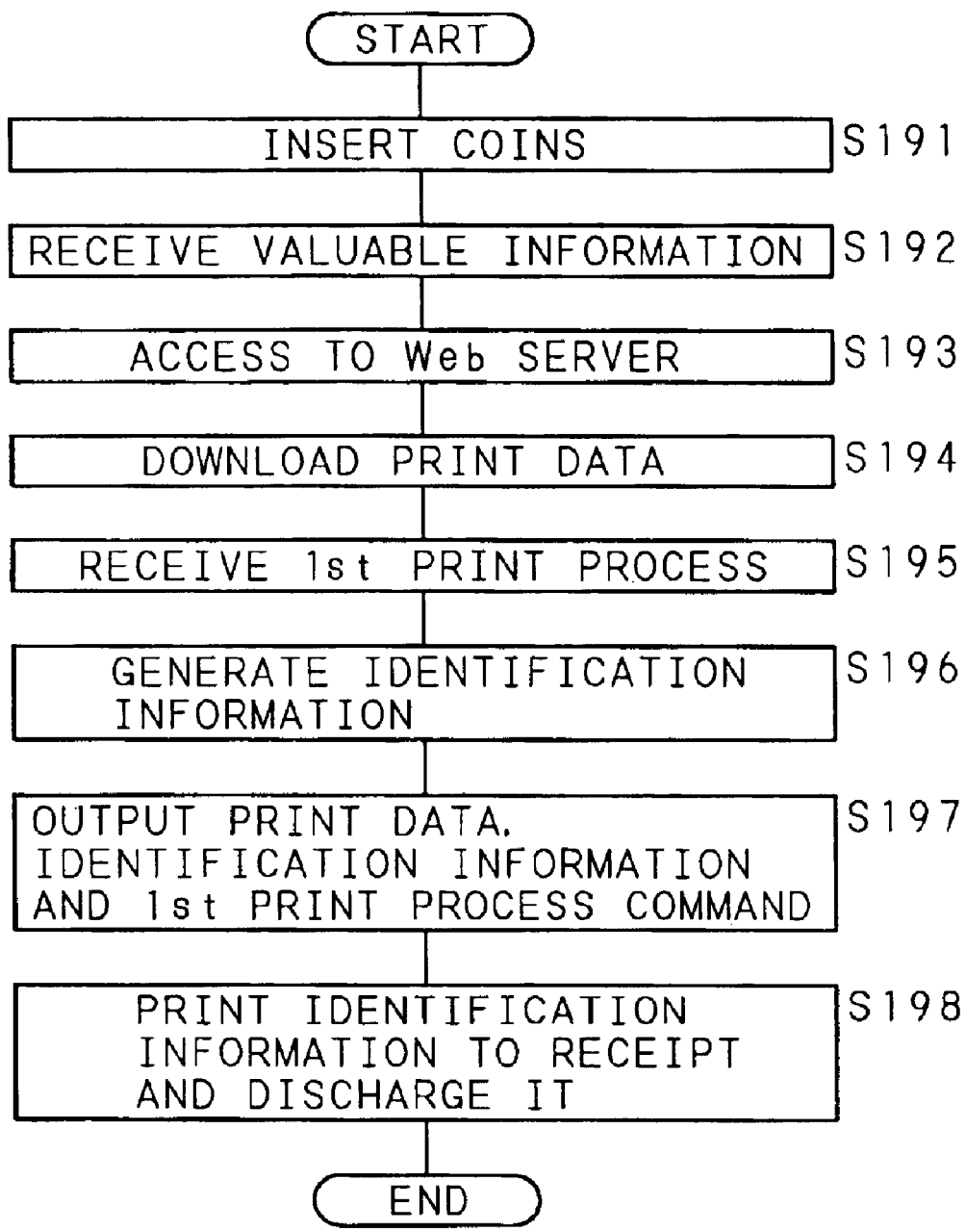
FIG. 24 is a flowchart showing the procedure executed by the port terminal.

With reference to the flowcharts, the following description will explain the procedure of print processes of the present invention performed with the above-described constructions. FIG. 24 is a flowchart showing the procedure executed by the port terminal 1. When a customer inserts a predetermined coins (step S191), the CPU 11 receives this information as valuable information (step S192). Subsequently, the CPU 11 accesses the Web server 5 (step S193), and downloads desired print data to be printed (step S194). Then, the CPU 11 receives the first print process command of the downloaded print data from the input unit 13 (step S195). When information indicating to start printing is inputted by the operation of the customer, the CPU 11 generates unique identification information for specifying the print data (step S196).

The CPU 11 of the port terminal 1 transmits the downloaded print data and the generated identification information together with the first print process command to the MFP 4 (step S197). Finally, the CPU 11 prints the generated identification information on a receipt by the printing unit 18 and discharges it (step S198). Consequently, the print data is transmitted to the MFP 4 and the first print process command is executed.

Figure 25:
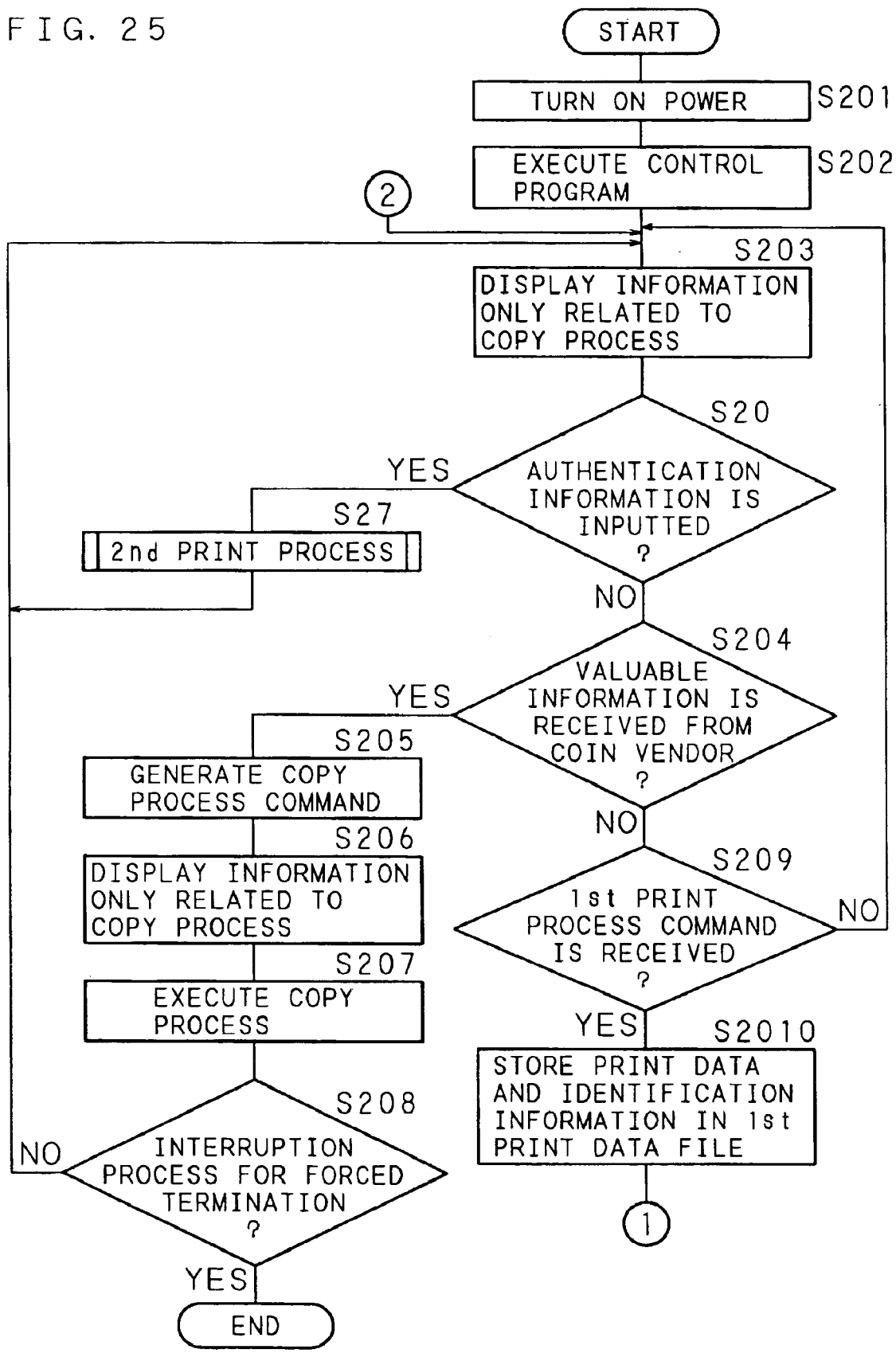
FIG. 25 is a flowchart showing the procedure executed by the multi function printer.
Figure 26:
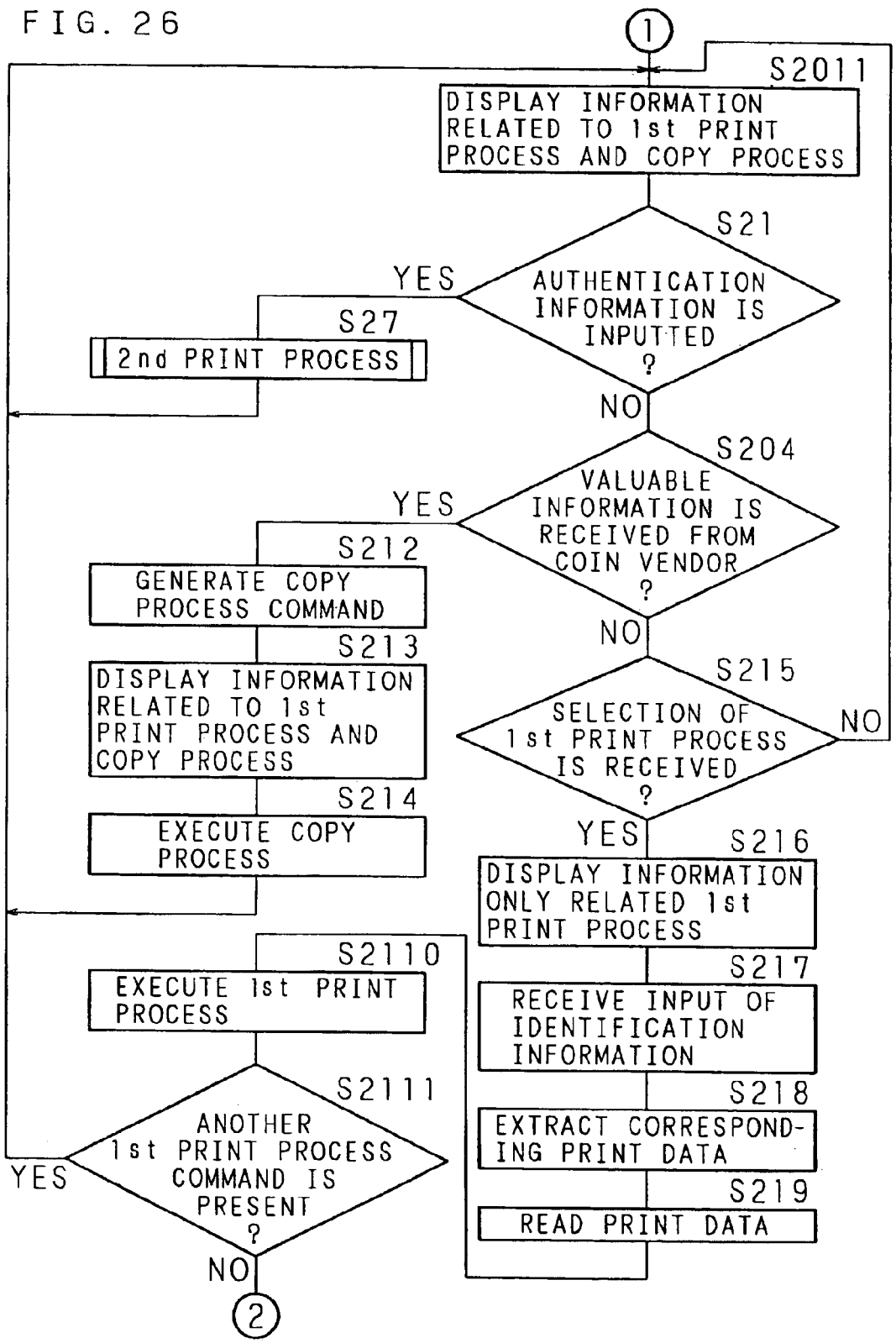
FIG. 26 is a flowchart showing the procedure executed by the multi function printer.
Figure 27:
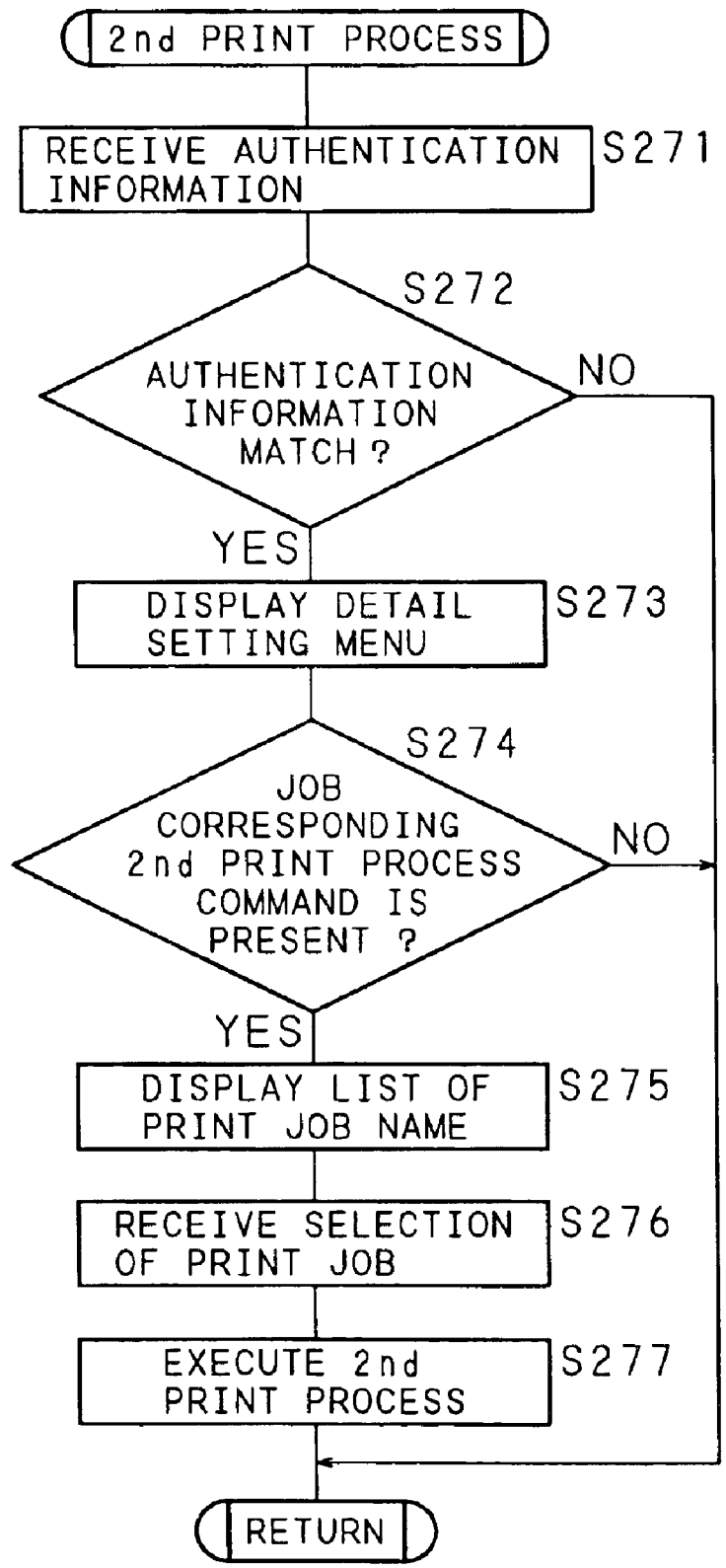
FIG. 27 is a flowchart showing the procedure executed by the multi function printer.

FIG. 25 through FIG. 27 are flowcharts showing the procedure executed by the MFP 4. First the manager of a convenience store turns on power of the MFP 4 (step S201). After turning on power, the CPU 51 of the MFP 4 executes the control program 55P and performs operations such as warm-up and initialization (step S202). Then, the CPU 51 reads only the information related to the copy process (third print information) from the guide information file 554 and displays it on the display unit 54 as shown in FIG. 6A (step S203). Here, the CPU 51 determines whether or not authentication information has been received (step S20). More specifically, the CPU 51 determines whether or not the ten-key of the input unit 53 has been operated and an authentication number consisting of a plurality of digits has been inputted. In the case where the authentication information has been received (YES in step S20), the CPU 51 executes a sub-routine for the second print process (step S27) as to be described later. In the case where the authentication information has not been received (NO in step S20), the CPU 51 determines whether or not the valuable information transmitted from the control unit 301 of the coin vendor 30 has been received (step S204). Here, in the case where the valuable information has been received (YES in step S204), the CPU 51 generates a copy process command (third print process command) (step S205), and displays only the information related to the copy process on the display unit 54 as shown in FIG. 6A (step S206) in the same manner as in step S203.

The CPU 51 suitably reads the guide information shown in FIG. 6B through FIG. 14 from the guide information file 554 and displays it on the display unit 54, and executes the copy process (step S207) until the valuable information becomes zero. Thereafter, the CPU 51 determines whether or not an interruption process for forced termination has been inputted by the manager of the convenience store through the ten-key 533 of the input unit 53 (step S208). In the case where the interruption process for forced termination has not been inputted (NO in step S208), the CPU 51 returns process to step S203 described above, and displays the standby screen shown in FIG. 5A on the display unit 54 again. The above processes are usually repeated. On the other hand, in the case where the interruption process for forced termination has been inputted (YES in step S208), the CPU 51 terminates the control program, turns off the power, and terminates the process.

In step S204, in the case where the CPU 51 determines that the valuable information from the coin vendor 30 has not been received (NO in step S204), the CPU 51 determines whether or not the first print process command has been received from the port terminal 1 (step S209). In the case where it is determined that the first print process command has not been received (NO in step S209), the CPU 51 returns process to step S203 described above, displays the standby screen shown in FIG. 6A on the display unit 54 again, and repeats the above procedure. On the other hand, in the case where it is determined that the first print process command has been received from the port terminal 1 (YES in step S209), the CPU 51 stores the print data transmitted from the port terminal 1 and identification information for specifying the print data in the first print data file 551 as shown in FIG. 15 (step S2010).

Subsequently, the CPU 51 reads the information related to the first print process (first print information) and the information related to the copy process (third print information) from the guide information file 554, and displays them as shown in FIG. 5 so that the customer can see both the information (step S2011). In this embodiment, the information related to the first print process and the information related to the copy process are equally displayed with substantially the center of the display unit 54 as the boundary, but the present invention is not limited to this form, and these pieces of information may be arranged in any layout.

In the state in which the information related to the copy process and the information related to the first print process are displayed as shown in FIG. 5, the CPU 51 determines whether or not authentication information has been received (step S21). Specifically, CPU 51 determines whether or not the ten-key of the input unit 53 has been operated and an authentication number consisting of a plurality of digits has been inputted. In the case where the authentication information has been received (YES in step S21), the CPU 51 executes a sub-routine for the second print process (step S27) as to be described later. In the case where the authentication information has not been received (NO in step S21), the CPU 51 determines whether or not the valuable information transmitted from the coin vendor 30 has been received (step S211). This embodiment illustrates a mode in which the valuable information is transmitted from the coin vendor 30 by push technology. However, it may be possible to use pull technology and periodically check whether or not the valuable information is present in the control unit 301 of the coin vendor 30 from the MFP 4, and transmit the valuable information from the coin vendor 30 to the MFP 4 when the valuable information is present.

In step S211, in the case where the CPU 51 determines that the valuable information has been received (YES in step S211), the CPU 51 generates a copy process command (step S212), and subsequently deletes (eliminates) the information related to the first print process on the display unit 54 and displays only the information about copy process on the display unit 54 as shown in FIG. 5A (step S213). Accordingly, even if the first print process is present, only the information related to the copy process is displayed when the copy process is started, and therefore the customer can carry out the copying operation without confusion. At this time, it may be possible to arrange the information related to the first print process to be deleted from the display unit 54, and arrange the information related to the copy process and common information such as time information to be displayed.

After the copy process is started, the CPU 51 suitably reads the guide information shown in FIG. 6B through FIG. 14 from the guide information file 554, displays it on the display unit 54, and executes the copy process (step S214). When the copy process is completed, the CPU 51 returns process to step S2011, and the information related to the copy process and the information related to the first print process are displayed on the display unit 54 again as shown in FIG. 4. In step S211, in the case where it is determined that the valuable information from the coin vendor 30 has not been received (S211), the CPU 51 determines whether or not a selection for executing or not executing the first print process has been received (step S215). More specifically, this determination is made by causing the CPU 51 to determine whether or not an operation signal from the "port terminal" button 531 shown in FIG. 5 has been inputted.

Here, in the case where a selection for executing the first print process has not been received (NO in step S215), the CPU 51 returns process to step S2011, and repeats the above-described procedure. On the other hand, in the case where a selection of the first print process has been received (YES in step S215), i.e., in the case where an operation signal generated by operating the "port terminal" button 531 has been received, the CPU 51 deletes (eliminates) the information related to the copy process from the display unit 54, and displays only the information related to the first print process on the display unit 54 as shown in FIG. 16A through FIG. 18B (step S216). At this time, it may be possible to arrange the information related to the copy process to be deleted from the display unit 54, and arrange the information related to the first print process and common information such as time information to be displayed. Consequently, since irreverent information is not displayed on the display unit 54, the customer who desires the first print process can execute the first print process without confusion.

Next, the CPU 51 displays information requesting an input of identification information on the display unit 54 as shown in FIG. 16A and receives an input of identification information from the ten-key 533 (step S217). From the ten-key 533, the customer inputs identification information printed on the receipt R outputted from the printing unit 18 of the port terminal 1 as the identification information. After receiving the input of identification information, the CPU 51 searches the first print data file 551 and extracts the corresponding print data based on the inputted identification information (step S218). The CPU 51 reads the extracted print data onto the RAM 52 (step S219), and executes the first print process (step S2110). After executing the first print process, the CPU 51 recognizes that the job has been completed, and rewrites the information in the history field of the corresponding print data in the first print data file 551 to "Completed" from "Not Completed". Note that when no corresponding data is present, the information requesting an input of identification information from the ten-key 533 is displayed on the display unit 54 again as shown in FIG. 17B.

As described above, since the MFP 4 as an image forming apparatus of the present invention prints the identification information on the receipt R and manages the print data of a plurality of customers by using the identification information, it is possible to prevent a plurality of customers from printing the print data of other persons by mistake. After the process of step S2110, the CPU 51 determines whether or not another first print process command is present in the print data file (step S2111). More specifically, the CPU 51 refers to the history field of the first print data file 551 and determines whether or not "Not Completed" is present in the history field. In the case where another first print process command is present (YES in step S2111), i.e., in the case where "Not Completed" is present in the history field, the CPU 51 returns process to step S2011, displays the information related to the copy process and the information related to the first print process on the display unit 54 again as shown in FIG. 4, and repeats the above-described procedure. On the other hand, in the case where another first print process command is not present (NO in step S2111), i.e., in the case where "Not Completed" is not present in the history field, the CPU 51 returns the initial state of step S203 and displays only the information related to the copy process on the display unit 54 as shown in FIG. 5A. Thus, in the MFP 4 as an image forming apparatus of the present invention, since the display of the display unit 54 is optimized according to the first print process command or the copy process command from the port terminal 1, a plurality of customers can perform printing without confusion and consequently the sales of the shop can be improved.

Next, the following description will explain the content of processes performed in displaying the second print information related to the second print process. The CPU 51 determines whether or not authentication information has been inputted after the process of step S203 or step S2011 (step S20, S21). In the case where authentication information has been inputted (YES in step S20 of FIG. 25 or step S21 of FIG. 26), the CPU 51 executes the sub-routine for the second print process shown in FIG. 27. First, the CPU 51 receives authentication information inputted from the ten-key 533 (step S271). The CPU 51 compares the received authentication information with the stored authentication information in the authentication file 555 and determines whether or not they match (S272). In the case where it is determined that they do not match (NO in step S272), the CPU 51 returns to step S203 or step S2011.

In the case where it is determined that they match (YES in step S272), the CPU 51 displays the detail setting menu stored in the guide information file 554 as shown in FIG. 20A (step S273). On the screen shown in FIG. 20A, when the "print for staff" button is operated, the CPU 51 determines whether or not there is a job corresponding to the second print process command outputted from the personal computer 2 (step S274). More specifically, the CPU 51 determines whether or not the print data outputted together with the second print process command from the personal computer 2 is stored as a job with "Not Completed" shown in the history field in the second print data file 552.

In the case where there is no corresponding job (NO in step S274), the CPU 51 returns to step S203 or step S2011 on condition that the "copy setting" or "service call" button is not operated, and displays the screen of FIG. 5 or FIG. 6A again. On the other hand, in the case where there is a corresponding job (YES in step S274), the CPU 51 displays a list of jobs corresponding to the second print process command as the second print information related to the second print process on the display unit 54 as shown in FIG. 20B (step S275). More specifically, the CPU 51 searches the second print data file 552, reads the file names of print data with "Not Completed" shown in the history field, and displays it on the display unit 54. Then, the CPU 51 receives a selection of one print job from the touch panel 536 (step S276). The CPU 51 reads the print data corresponding to the received print job from the second print data file 552 and outputs it to the image forming unit 6, thereby executing the second print process (step S277). Thereafter, similarly to the above, the CPU 51 returns to step S203 or step S2011 and displays the screen shown in FIG. 5 or FIG. 6A again. Thus, in the MFP 4 as an image forming apparatus of the present invention, since the information for customers (first print information and third print information) and the information for shop staff (second print information) are separately displayed under certain condition, it is possible to prevent print data for business use from being given to customers by mistake and prevent confusion caused by the display of information irrelevant for customers.

As described above, according to the present invention, when a print process command is outputted from the port terminal 1 serving as the first information processing apparatus, the first print information related to the first print process command of the port terminal 1 is displayed on the display unit 54 serving as displaying means. Then, the MFP 4 as the image forming apparatus prints the print data outputted from the port terminal 1 on condition that the first print information is displayed on the display unit 54. On the other hand, when a print process command is outputted from the personal computer 2 serving as the second information processing apparatus, authentication information is received, and, only if the received authentication information matches the pre-stored authentication information, the second print information related to the second print process command of the personal computer 2 is displayed on the display unit 54. Then, the MFP 4 prints the print data outputted from the personal computer 2 on condition that the second print information is displayed on the display unit 54. Consequently, there is no fear that the print data for business use is seen by customers, and it is possible to ensure security. Moreover, since the second print information is not displayed on the display unit if these pieces of authentication information do not match, the customer can refer to his/her own third print information related to copying or first print information related to printing and use the MFP 4 without confusion.

Furthermore, in the present invention, the port terminal 1 outputs print data and identification information for specifying each print data and directly inputs to the MFP 4. In addition, the port terminal 1 separately outputs identification information to outside. The MFP 4 receives from outside an input of identification information which is once outputted to outside, and compares the received authentication information with the authentication information directly inputted from the port terminal 1. When these pieces of authentication information match, the print data corresponding to the matched identification information is extracted and printed. Accordingly, since the customer can have the identification information outputted from the MFP 4 to outside in a state in which the identification information is printed on a receipt, for example, it is not necessary to immediately use the MFP 4. Consequently, the customer can have spare time for shopping in the shop, and this leads to promotion of sales. Moreover, it is also possible to prevent the print data of the customer from being mixed with the print data of other customers.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A printing method for causing an image forming apparatus, including displaying means, arithmetic means and inputting means, to print print data outputted from a first information processing apparatus or a second information processing apparatus respectively connected to said image forming apparatus through a network, comprising the steps of:

when a print process command is outputted from said first information processing apparatus to said image forming apparatus, by said arithmetic means, displaying first print information related to the print process command of said first information processing apparatus on said displaying means;

by said inputting means, receiving authentication information;

comparing the authentication information received by said inputting means with pre-stored authentication information; and when a print process command is outputted from said second information processing apparatus to said image forming apparatus and the compared result of both authentication information match, by said arithmetic means, displaying second print information related to the print process command of said second information processing apparatus on said displaying means, instead of the first print information.

2. The printing method as set forth in claim 1, further comprising the steps of:

printing the print data outputted from said first information processing apparatus, after the first print information is displayed on said displaying means; and printing the print data outputted from said second information processing apparatus, after the second print information is displayed on said displaying means.

3. The printing method as set forth in claim 2, further comprising the steps of:

by said first information processing apparatus, outputting print data and identification information for identifying said print data to said image forming apparatus;

by said first information processing apparatus, outputting said identification information to outside;

by said image forming apparatus, receiving an input of identification information from outside when said displaying means displays the first print information;

by said image forming apparatus, extracting print data identified by identification information that matches said received identification information; and by said image forming apparatus, printing the extracted print data.

4. A printing method for causing an image forming apparatus, including displaying means, arithmetic means, inputting means and reading means for reading a document and generating print data, to print print data outputted from a first information processing apparatus or a second information processing apparatus respectively connected to said image forming apparatus through a network, or print data generated by said reading means, comprising the steps of:

when a print process command is outputted from said first information processing apparatus to said image forming apparatus, by said arithmetic means, displaying first print information related to the print process command of said first information processing apparatus on said displaying means;

displaying document print process information related to a print process command of print data generated by said reading means on said displaying means;

receiving authentication information by said inputting means;

comparing the authentication information received by said inputting means with pre-stored authentication information; and when a print process command is outputted from said second information processing apparatus to said image forming apparatus and the compared result of both authentication information match, by said arithmetic means, displaying second print information related to the print process command of said second information processing apparatus on said displaying means, instead of said first print information or said document print process information.

5. The printing method as set forth in claim 4, further comprising the steps of:

printing the print data outputted from said first information processing apparatus, after said first print information is displayed on said displaying means;

printing the print data outputted from said second information processing apparatus, after said second print information is displayed on said displaying means; and printing the print data generated by said reading means, after said document print process information is displayed on said displaying means.

6. The printing method as set forth in claim 5, further comprising the steps of:

by said first information processing apparatus, outputting print data and identification information for identifying said print data to said image forming apparatus;

by said first information processing apparatus, outputting the identification information to outside;

by said image forming apparatus, receiving an input of identification information from outside when said displaying means displays the first print information;

by said image forming apparatus, extracting print data identified by identification information that matches said received identification information; and printing said extracted print data.

7. A printing system for causing an image forming apparatus to print print data outputted from a first information processing apparatus or a second information processing apparatus respectively connected to said image forming apparatus through a network, wherein said image forming apparatus comprises:

displaying means;

first display controlling means for displaying, when a print process command is outputted from said first information processing apparatus, first print information related to the print process command of said first information processing apparatus on said displaying means;

authentication information receiving means for receiving authentication information;

means for comparing the authentication information received by said authentication information receiving means with pre-stored authentication information; and second display controlling means for displaying, when a print process command is outputted from said second information processing apparatus and the compared result of both authentication information match, second print information related to the print process command of said second information processing apparatus on said displaying means, instead of the first information.

8. The printing system as set forth in claim 7, wherein said image forming apparatus further comprises:
first printing means for printing the print data outputted from said first information processing apparatus, after the first print information is displayed on said displaying means by said first display controlling means; and
second printing means for printing the print data outputted from said second information processing apparatus, after the second print information is displayed on said displaying means by said second display controlling means.

9. The printing system as set forth in claim 8, wherein
said first information processing apparatus comprises: outputting means for outputting to said image forming apparatus print data and identification information for identifying said print data; and identification information outputting means for outputting the identification information to outside, and
said image forming apparatus comprises: identification information receiving means for receiving an input of identification information from outside when the first print information is displayed by said first display controlling means; and extracting means for extracting print data identified by identification information that matches the identification information received by said identification information receiving means,
whereby said first printing means prints the print data extracted by said extracting means.

10. A printing system for causing an image forming apparatus, including displaying means, inputting means and reading means for reading a document and generating print data, to print print data outputted from a first information processing apparatus or a second information processing apparatus respectively connected to said image forming apparatus through a network, or print data generated by said reading means, wherein said image forming apparatus comprises:
first display controlling means for displaying, when a print process command is outputted from said first information processing apparatus, first print information related to the print process command of said first information processing apparatus on said displaying means;
document print process information display controlling means for displaying document print process information related to a print process command of print data generated by said reading means on said displaying means;
authentication information receiving means for receiving authentication information;
means for comparing the authentication information received by said authentication information receiving means with pre-stored authentication information; and
second display controlling means for displaying, when a print process command is outputted from said second information processing apparatus and the compared result of both authentication information match, second print information related to the print process command of said second information processing apparatus on said displaying means.

11. The printing system as set forth in claim 10, wherein said image forming apparatus further comprises:
first printing means for printing the print data outputted from said first information processing apparatus, after the first print information is displayed on said displaying means by said first display controlling means;
second printing means for printing the print data outputted from said second information processing apparatus, after the second print information is displayed on said displaying means by said second display controlling means; and
third printing means for printing the print data generated by said reading means, after the document print process information is displayed on said displaying means by said document print process information display controlling means.

12. The printing system as set forth in claim 11, wherein
said first information processing apparatus comprises: outputting means for outputting print data and identification information for identifying said print data to said image forming apparatus; and identification information outputting means for outputting the identification information to outside, and
said image forming apparatus comprises: identification information receiving means for receiving an input of identification information from outside when the first print information is displayed by said first display controlling means; and extracting means for extracting print data identified by identification information that matches the identification information received by said identification information receiving means,
whereby said first printing means prints the print data extracted by said extracting means.

13. An image forming apparatus, including displaying means, for printing the print data outputted from a first information processing apparatus or a second information processing apparatus respectively connected thereto through a network, comprising:
first display controlling means for displaying, when a print process command is outputted from said first information processing apparatus, first print information related to the print process command of said first information processing apparatus on said displaying means;
authentication information receiving means for receiving authentication information;
means for comparing the authentication information received by said authentication information receiving means with pre-stored authentication information; and
second display controlling means for displaying, when a print process command is outputted from said second information processing apparatus and the compared result of both authentication information match, second print information related to the print process command of said second information processing apparatus on said displaying means.

14. The image forming apparatus as set forth in claim 13, further comprising:
first printing means for printing the print data outputted from said first information processing apparatus, after the first print information is displayed on said displaying means by said first display controlling means; and
second printing means for printing the print data outputted from said second information processing apparatus, after the second print information is displayed on said displaying means by said second display controlling means.

15. The image forming apparatus as set forth in claim 14, further comprising:
identification information receiving means for receiving identification information inputted from outside for identifying print data outputted from said first information processing apparatus to outside; and
extracting means for extracting print data outputted from said first information processing apparatus which is identified by identification information that matches the identification information received by said identification information receiving means,
whereby said first printing means prints the print data extracted by said extracting means.

16. An image forming apparatus, including displaying means, inputting means and reading means for reading a document and generating print data, for printing print data outputted from a first information processing apparatus or a second information processing apparatus respectively connected thereto through a network, or print data generated by said reading means, comprising:
first display controlling means for displaying, when a print process command is outputted from said first information processing apparatus, first print information related to the print process command of said first information processing apparatus on said displaying means;
document print process information display controlling means for displaying document print process information related to a print process command of image data of a document to be read by said reading means on said displaying means;
authentication information receiving means for receiving authentication information;
means for comparing the authentication information received by said authentication information receiving means with pre-stored authentication information; and
second display controlling means for displaying, when a print process command is outputted from said second information processing apparatus and the compared result of both authentication information match, second print information related to the print process command of said second information processing apparatus on said displaying means.

17. The image forming apparatus as set forth in claim 16, further comprising:
first printing means for printing the print data outputted from said first information processing apparatus, after the first print information is displayed on said displaying means by said first display controlling means;
second printing means for printing the print data outputted from said second information processing apparatus, after the second print information is displayed on said displaying means by said second display controlling means; and
third printing means for printing the print data generated by said reading means, after the document print process information is displayed on said displaying means by said document print process information display controlling means.

18. The image forming apparatus as set forth in claim 17, further comprising:
identification information receiving means for receiving identification information inputted from outside for identifying print data outputted from said first information processing apparatus to outside; and
extracting means for extracting print data outputted from said first information processing apparatus which is identified by identification information that matches the identification information received by said identification information receiving means,
whereby said first printing means prints the print data extracted by said extracting means.

19. An image forming apparatus, including displaying means for printing the print data outputted from a first information processing apparatus or a second information processing apparatus respectively connected thereto through a network, comprising a processor capable of performing the following operations of:
when a print process command is outputted from said first information processing apparatus, displaying first print information related to the print process command of said first information processing apparatus on said displaying means;
receiving authentication information;
comparing the received authentication information with pre-stored authentication information; and
when a print process command is outputted from said second information processing apparatus and the compared result of both authentication information match, displaying second print information related to the print process command of said second information processing apparatus on said displaying means, instead of the first print information.

20. The image forming apparatus as set forth in claim 19, wherein said processor is further capable of performing the following operations of:
printing the print data outputted from said first information processing apparatus, after the first print information is displayed on said displaying means; and
printing the print data outputted from said second information processing apparatus, after the second print information is displayed on said displaying means.

21. The image forming apparatus as set forth in claim 20, wherein said processor is further capable of performing the following operations of:
receiving an input of identification information inputted from outside for identifying print data outputted from said first information processing apparatus to outside;
extracting print data outputted from said first information processing apparatus which is identified by identification information that matches the received identification information; and
printing the extracted print data.

22. An image forming apparatus, including displaying means, inputting means and reading means for reading a document and generating print data, for printing print data outputted from a first information processing apparatus or a second information processing apparatus respectively connected thereto through a network, or print data generated by said reading means, comprising a processor capable of performing the following operations of:
when a print process command is outputted from said first information processing apparatus, displaying first print information related to the print process command of said first information processing apparatus on said displaying means;
displaying document print process information related to a print process command of image data of a document to be read by said reading means on said displaying means;

receiving authentication information;

comparing the received authentication with pre-stored authentication information; and when a print process command is outputted from said second information processing apparatus and the compared result of both authentication information match, displaying second print information related to the print process command of said second information processing apparatus on said displaying means.

23. The image forming apparatus as set forth in claim 22, wherein said processor is further capable of performing the following operations of:

printing the print data outputted from said first information processing apparatus, after the first print information is displayed on said displaying means;

printing the print data outputted from said second information processing apparatus, after the second print information is displayed on said displaying means; and printing the print data generated by said reading means, after the document print process information is displayed on said displaying means.

24. The image forming apparatus as set forth in claim 23, wherein said processor is further capable of performing the following operations of:

receiving identification information inputted from outside for identifying print data outputted from said first information processing apparatus to outside;

extracting print data outputted from said first information processing apparatus which is identified by identification information that matches the received identification information, and printing the extracted print data.

* * * * *